United States Patent
Hesterman et al.

[19]

[11] Patent Number: 5,834,864
[45] Date of Patent: Nov. 10, 1998

[54] MAGNETIC MICRO-MOVER

[75] Inventors: Victor W. Hesterman, Los Alto Hills; Robert G. Walmsley; Jobst Brandt, both of Palo Alto, all of Calif.

[73] Assignee: Hewlett Packard Company, Palo Alto, Calif.

[21] Appl. No.: 527,479

[22] Filed: Sep. 13, 1995

[51] Int. Cl.$^6$ .................................................. G11B 5/596
[52] U.S. Cl. ............................... 310/40 MM; 156/655.1; 360/78.05; 360/78.12
[58] Field of Search .............................. 310/12, 40 MM; 360/78.05, 109, 105, 78.12; 156/655.1, 656.1, 657.1, 659.11, 661.1, 662.1

[56] References Cited

U.S. PATENT DOCUMENTS

| | | | |
|---|---|---|---|
| 4,668,865 | 5/1987 | Gimzewski et al. | 250/306 |
| 4,812,199 | 3/1989 | Sickafus | 156/626 |
| 5,153,494 | 10/1992 | Hollis, Jr. | 318/640 |
| 5,359,474 | 10/1994 | Riederer | 360/78.05 |
| 5,408,355 | 4/1995 | Rauch et al. | 359/298 |
| 5,589,082 | 12/1996 | Lin et al. | 216/2 |

FOREIGN PATENT DOCUMENTS

| | | | |
|---|---|---|---|
| 0371661A2 | 11/1989 | European Pat. Off. | H02K 29/06 |
| 0517061A1 | 5/1992 | European Pat. Off. | B25J 5/00 |
| 0578228A3 | 7/1993 | European Pat. Off. | H02N 1/100 |
| 0686863A1 | 8/1994 | European Pat. Off. | G02B 26/10 |
| 19601018A1 | 1/1995 | Germany | G01B 5/00 |
| WO 92/20842 | 11/1992 | WIPO | H01J 37/63 |
| WO 96/04525 | 2/1996 | WIPO | G01C 19/56 |

OTHER PUBLICATIONS

J. Markert, M. Rauch, U. Breng, P. Kirst, C. Kaufman, Burgstadt, und R. Hantke, Chemnitz, "Elektrostatischer Mikroaktor", 449 F&M Feinwerktechnik & Messtechnik 101 (1993) Mai, No.5, Munchen, DE.

W. Dotzel, R. Kiehnscherf, Chemnitz, und T. Ziegler, Berlin, "Mikromechanische Aktoren magnetisch betatigen", 449 F&M Feinwerktecnik & Messtechnik 100 (1992) Nov., No. 11, Munchen, DE.

Wagner et al, "Permanent Magnet Micromotors on Silicon Substrates," Journal of Microelectromechanical Systems, vol. 2, No. 1, Mar. 1993, pp. 23–29.

Ahn et al., "A Planar Variable Reluctance Magnetic Micromotor with Fully Integrated Stator and Coils," Journal of Microelectromechanical Systems, vol. 3, No. 4, Dec. 1993, pp. 165–173.

Busch–Vishniac, "The case for magnetically driven microactuators," Sensors and Actuators, A (1992) pp. 207–220 month unknown.

Fujita et al., "New Opportunities for Micro Actuators," IEEE (1991), pp. 14–20 month unknown.

Fan et al., "Batch–Fabricated Milli–Actuators," IEEE (1993) pp. 179–183 month unknown.

Brennan et al., "Large Displacement Linear Actuator," IEEE (1990) pp. 135–139 month unknown.

(List continued on next page.)

Primary Examiner—Steven L. Stephan
Assistant Examiner—Judson H. Jones
Attorney, Agent, or Firm—Timothy Rex Croll

[57] ABSTRACT

A specially designed, forceful, compact magnetic micromover includes at least one etched single crystal silicon plate having integral springs and stable, low internal stress. A structure of springs which support a rectangular plate are etched in silicon. The plate is driven by planar electromagnetic actuation. The micro-mover consists of a specific etched silicon spring in combination with a planar electromagnetic moving coil actuator that is capable of generating forces greater than 50 mN, while dissipating less than 1 W peak power. The micro-mover also includes a plate suspension system that facilitates the required plate motions and resolution, while preventing changes in plate spacing from effects such as external acceleration, temperature, humidity, and aging; and includes an actuator that appropriately moves the plates in response to electrical signals, such that there is only minimal cross-talk between axes of motion.

26 Claims, 18 Drawing Sheets

OTHER PUBLICATIONS

Takeshima et al., "Electrostatic Parallelogram Actuators," IEEE (1991) pp. 63–66 month unknown.

Hirano et al., "Design, Fabrication, and Operation of Sub-micron Gap Comb–Drive Microactuators," Journal of Microelectromechanical Systems, vol. 1, No. 1, Mar. 1992, pp. 52–59.

Niino et al., "High–Power and High–Efficiency Electrostatic Actuator," IEEE (1993) pp. 236–241 month unknown.

Minami et al., "Fabrication of Distributed Electrostatic Micro Actuator (DEMA)," Journal of Microelectromechanical Systems, vol. 2, No. 3, Sep. 1993, pp. 121–127.

Wallrabe et al., "Theoretical and Experimental Results of an Electrosttic Micro Motor with Large Gear Ratio Fabricated by the Liga Process," Micro Electro Mechanical Systems '92, Travemünde (Germany), Feb. 4–7, 1992, pp. 139–140.

Wise, "Integrated Silicon Sensors: Technology and Microstructures," IEEE 1991, pp. 412–424 month unknown.

Guckel et al., "Fabrication of Assembled Micromechanical Components Via Deep X–Ray Lithography," IEEE 1991, pp. 74–79 month unknown.

McCormick et al., "Microengineering design and manufacture using the LIGA process," Engineering Science and Education Journal, Dec. 1994, pp. 255–262.

Kenny et al., "A Micromachined Silicon Electron Tunneling Sensor," IEEE 1990, pp. 192–196 month unknown.

MacDonald, "Single Crystal Silicon Nanomechanisms for Scanned–Probe Device Arrays," IEEE 1992, pp. 1–5 month unknown.

"51st Annual Device Research Conference," IEEE Transactions on Electron Devices, vol. 40, No. 11, Nov. 1993, pp. 2098–2099.

Judy et al., "Magnetic Microactuation of Polysilicon Flexure Structures," 1994 Solid–State Sensor and Actuator Workshop (Hilton Head, SC), Jun. 1994.

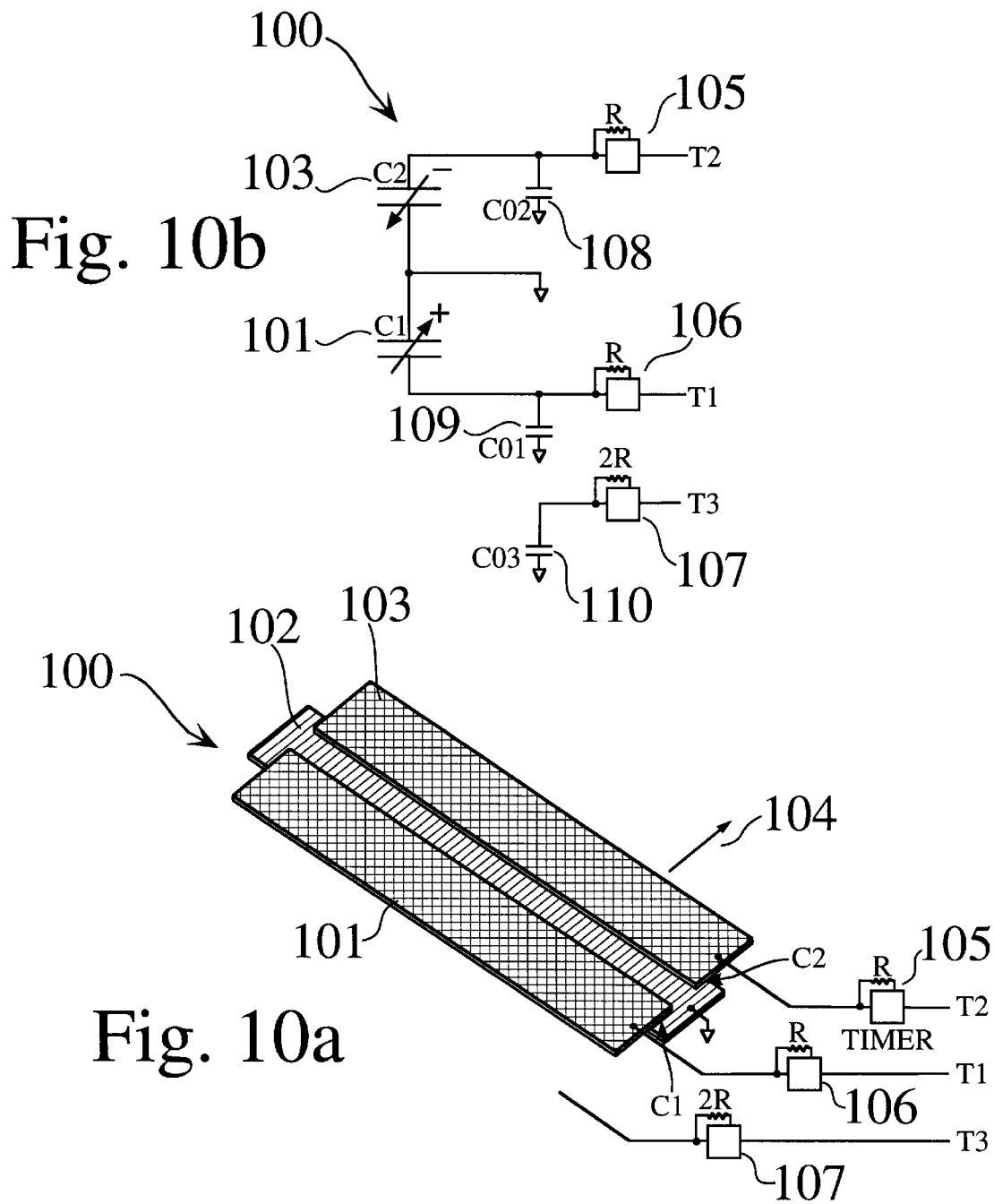

MAGNETIC MICRO-MOVER

BACKGROUND OF THE INVENTION

Technical Field

The invention relates to actuators. More particularly, the invention relates to micro-mover actuators.

Description of the Prior Art

A memory device, using two parallel plates that carry read-write transducers on one plate and a recording medium on the other plate, requires a micro-mover to move its elements orthogonally relative to one another in-plane, and to control the spacing between the elements. The object of such device is to move an array of read-write elements on one plate to scan a recording medium on the opposing plate, such that the combined relative in-plane motion of the two plates facilitates data transfer to and from the recording medium. Such motion enables each element to access an area equal to the product of the relative X- and Y-motion. Accurate spacing control between the two plates is necessary to enable non-contacting motion, while maintaining the proximity of the plates required to enable data transfer.

Typically, this can be accomplished by an approximately 6 mm square silicon plate that is moved relative to a similar plate in three orthogonal directions with a relative in-plane motion of about 100 $\mu$m in the X and Y directions, and whose spacing Z must be adjustable in a range of about 0.4 $\mu$m. The X and Y travel must be continuous with a resolution of about 20 nm while the Z travel requires a resolution of about 10 nm over the entire recording area. Using silicon, a plate of 300–400 $\mu$m thickness appears essential to maintain adequate flatness. In such an application, a 400 $\mu$m thick plate with a moving mass of 35 mg must be accelerated at more than 10 G's (100 M/s$^2$) to achieve an access time of 1 msec. The ability to respond to external perturbations may require more than 50 G's of acceleration. The minimum driving force required for a 50 G acceleration is 17.5 mN. Other designs where spring forces become dominant may require forces greater than 40 mN. However, peak power to achieve this motion must remain low, specifically below 1 W for the example just described.

A number of micro-mover actuators have been proposed. The most common actuator for micro-movers uses a capacitive electric comb in which arrays of conducting fingers of opposing polarity are interleaved. The fingers are drawn into greater engagement when a voltage is applied to them. The force generated by this approach, in SI units, is given by the equation:

$$F = \frac{WNV^2}{2\mu_o c^2 d} \quad (1)$$

where $2\mu_o c^2 = 2.22 \times 10^{11}$, W is the width of the fingers perpendicular to the motion, N is the number of spaces, V is the voltage, and d is the spacing between the fingers. The principal drawback to this approach is the limited amount of force that is achievable for practical voltages V and spacing d. Assuming the following, V=100 volts, N=100 spaces, W=20 $\mu$m, and d=1 $\mu$m, the resulting force is 0.09 mN (9.0×10$^{-5}$N). This force is 500 times too small for the application described above. It is not currently feasible to produce a W/d ratio greater than 20:1 except with LIGA (see M. McCormick, E. Chowanietz, A. Lees, *Microengineering Design and Manufacture Using the LIGA Process*, IEEE Engineering Science and Education Journal, pp. 255–262, December 1994), which is impractical for single crystal silicon. Electric fields V/d exceeding about 1×10$_8$ V/m, as in this example, are not practical.

Other known micro-actuators include:

A piezo-electric transducer that expands when a voltage is applied to it. A piezo motor can produce large forces with small motion, but has excessive hysteresis, responds too slowly, and the size required to produce sufficient motion is too large;

A magnetostrictive motor that when magnetized expands in length. However, such an actuator requires excessive length to achieve adequate travel, even with large magnetostrictive materials such as terbium iron, TbFe$_2$, in which saturation magnetostriction can achieve over 2000 ppm length changes; and A micro-actuator, referred to as an inchworm, uses either a piezo or magnetostrictive element. Such actuators generate many small steps to produce larger motion. Their drawback is the use of friction clamps that are not repeatable and whose sliding surfaces wear and generate unacceptable debris.

Conventional linear electromagnetic motors are also known that generate large attractive forces in the Z direction, between the parts moving in the X- or Y-direction, thereby producing excessive relative Z-motion. Because sliding bearings wear, cause wear debris, and have excessive friction, they cannot be used to prevent Z-motion. Ball bearings have excessive runout and hysteresis for these small motions.

Thermal expansion or phase change motors present problems similar to piezo and magnetostriction motors, including insufficient travel for practical size. Phase change motors use temperature induced phase change in a material to produce motion that is not adequately controllable because it is hysteretic and nonlinear with temperature.

Stages with sliding or rolling bearings cannot be used to support the two plates because they have excessive friction, wear, hysteresis, and backlash in their mechanisms. Previous designs have been unable to achieve high forces while maintaining the small package, light weight, low power consumption, low hysteresis, and high resolution necessary in a mover for such applications as parallel plate memory devices. Reducing plate mass by thinning or hollowing regions would increase distortions caused by external shock and internal stress, thereby compromising flatness. It would therefore be desirable to provide a mover constructed of a solid thick plate having relatively high mass and one that achieves enough force, e.g. about 40 mN, to accelerate plates that are sufficiently thick to maintain required dimensional stability over a large recording area, e.g. 5×5 mm.

SUMMARY OF THE INVENTION

The invention provides a forceful, compact magnetic micro-mover that includes at least one etched single crystal silicon plate having integral springs that provide a stable, low internal stress. Although discussed above in the context of a storage device having two or more moving plates, the described mechanism is applicable to numerous other applications.

The micro-mover includes a structure of springs etched in silicon that support a rectangular plate which, in the preferred embodiment of the invention, is about 6×6 mm. The plate is driven by planar electromagnetic actuation. While etched silicon spring structures are known (see R. A. Brennan, M. G. Lim, A. P. Pisano, A. T. Chou, *Large Displacement Linear Actuator*, Technical Digest, IEEE Solid-State Sensor and Actuator Workshop, pp. 135–139

(1990); N. Takeshima, K. J, Gabriel, M. Ozaki, J. Takehashi, H. Horiguchi, H. Fujita, *Electrostatic Parallelogram Actuators*, Transducers '91, 1991 International Conference on Solid-State Sensors and Actuators, Digest of Technical Papers, pp. 63–66 (1991); T. Hirano, T. Furuhata, K. J. Gabriel, H. Fujita, *Design, Fabrication, and Operation of Submicron Gap Comb-Drive Microactuators*, J. Microelectromechanical Systems, Vol. 1, No. 1, pp. 52–59 (1992); and S. Johansson, J. Schweitz, *Fracture Testing of Silicon Microelements in situ in a Scanning Electron Microscope*, J. Appl. Phys. 63 (10), pp. 4799–4803 (1988)), such structures have heretofore had insufficient travel and/or insufficient Z-stiffness. The invention herein provides tall, narrow, relatively compact springs that are specifically designed to exhibit the required lateral travel and high vertical stiffness. The micro-mover thus consists of a specific etched silicon spring in combination with a planar electromagnetic (i.e. voice coil) actuator that is capable of generating large forces (>40 mN), while dissipating less than 1 W peak power.

The micro-mover also includes a plate suspension system that facilitates the required plate motions and resolution, while preventing changes in plate spacing from effects such as external acceleration, temperature, humidity, and aging; and includes an actuator that appropriately moves the plates in response to electrical signals, such that there is only minimal cross-talk between axes of motion.

BRIEF DESCRIPTION OF THE DRAWINGS

FIG. 9b is a schematic diagram of the capacitance bridge position sensor of FIG. 9a;

FIG. 10a is a partial schematic diagram/perspective view of a capacitance timer position sensor according to an alternative, equally preferred embodiment of the invention;

FIG. 10b is a schematic diagram of the capacitance timer position sensor of FIG. 10a;

FIG. 10c is a graph plotting signal strength versus plate position for a micro-mover that incorporates the capacitance timer position sensor of FIG. 10a;

DETAILED DESCRIPTION OF THE INVENTION

This invention consists of an etched single crystal silicon spring-and-plate design that is moved by an electromagnetic actuator incorporated into the mover. Two preferred micro-mover configurations are described herein, although the invention is readily applied to other configurations, depending upon its use. A first preferred configuration (see FIGS. 1 and 2) has two essentially identical, closely spaced plates, wherein one plate is adapted for movement in the X-direction and the other plate is adapted for movement in the Y-direction. A second, equally preferred configuration (see FIG. 3) has compound springs that are adapted to allow one plate to move in both the X- and Y- directions, opposite a second stationary plate, that is not shown.

Two significant novel design features of the micro-mover herein described include:

A plate suspension that facilitates the required relative plate motions and resolution, while preventing changes in plate spacing due to such effects as external acceleration, internal stress, temperature, humidity, and aging; and An electromagnetic drive that appropriately moves the plates in response to electrical signals, with minimal cross-talk between the axes of motion.

Figure 1:
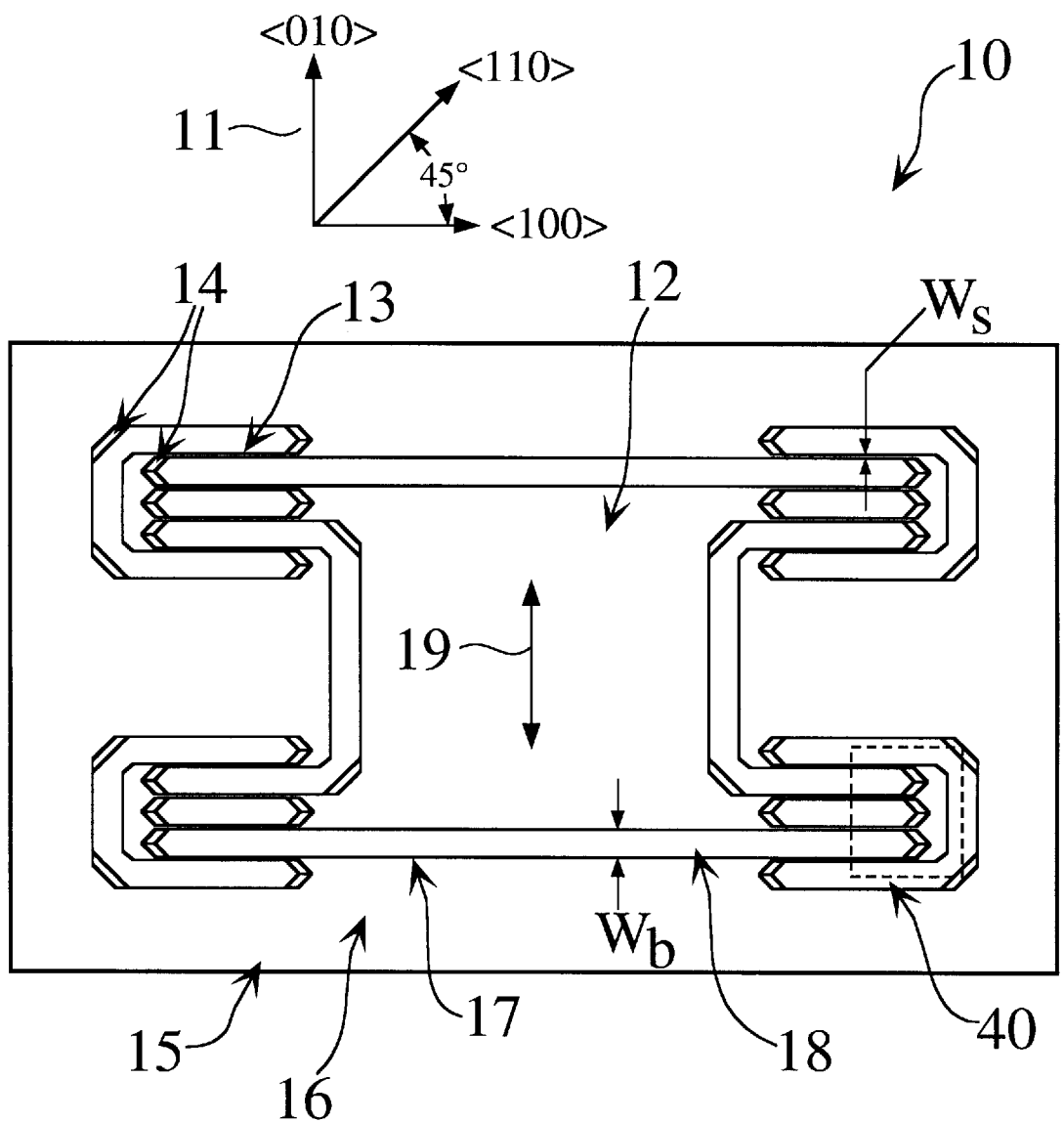
FIG. 1 is a plan view of a single crystal silicon micro-mover according to a preferred embodiment of the invention.

FIG. 1 is a top plan view of a single crystal silicon micro-mover according to the first preferred embodiment of the invention. The figure shows one of two plates 10 of the micro-mover, in which a moving plate 12 is held in suspension relative to an outer frame 15 by several silicon support springs 13. Relative motion of the plate 12 is indicated by the arrow that is identified by the numeric designator 19.

Orientation of the wafer from which the plate 10 is fabricated is indicated in the figure by the numeric designator 11, which shows a <110> wafer flat for a (100) wafer, where "<110>" denotes a 110 crystallographic direction and "(100)" denotes a 100 crystallographic plane. The (111) silicon planes 14 of the wafer and the (100) silicon plane perpendicular to the plate plane 17 are also shown in the figure. The actual spring thickness Ws may be on the order of 40 μm, while the etch gap Wb where silicon is removed 18 may be on the order of 470 μm.

The exemplary micro-mover includes four springs formed at each corner of the moving plate. This spring configuration is a symmetric double folded spring. When a plate is moved to an off center position, the springs are each bent into an "S" shape. This shortens the horizontal projected length of each spring. If a single non-folded spring were used at each corner of the plate, plate motion would require both bending and axial lengthening of each spring. This axial lengthening (tensioning) produces a non-linear Y spring constant that is not compatible with the requirements of a large Y travel, a large ratio of Z stiffness to Y stiffness, and a compact spring design. Axial shortening can be accommodated by using a folded spring design. However, a single folded spring does not provided a large ratio of Z stiffness to Y stiffness. This problem is solved by using a symmetrical double folded spring design as shown in FIG. 1. This spring design has a linear Y spring constant and a large ratio of Z stiffness to Y stiffness (>100).

Figure 2:
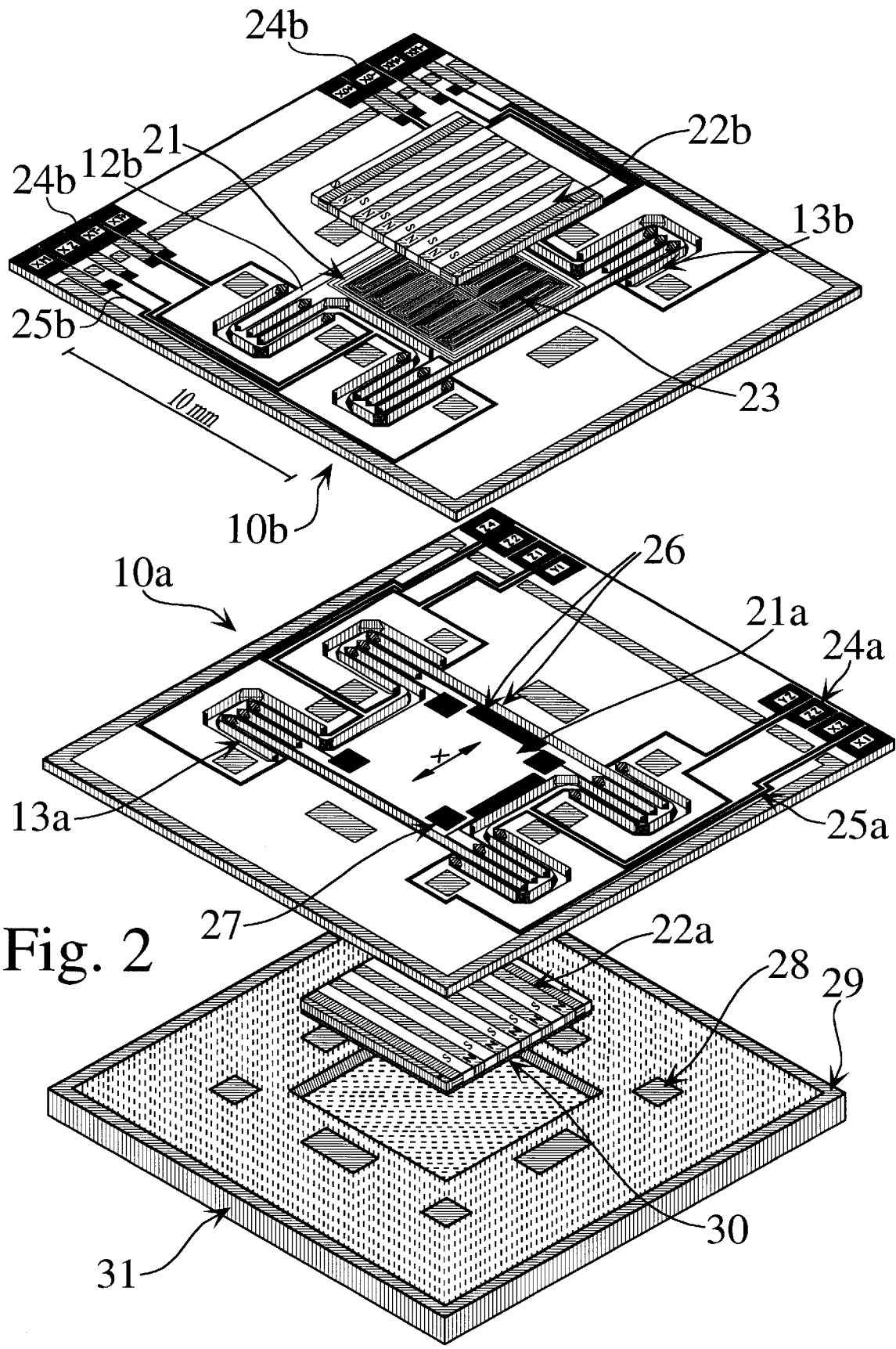
FIG. 2 is an exploded view of a micro-mover according to the preferred embodiment of the invention.

FIG. 2 is an exploded view of a micro-mover 20 according to the first preferred embodiment of the invention. Two of the plates 10a, 10b described above in connection with FIG. 1 are assembled facing each other, closely spaced and parallel, with their axes of motion orthogonal to one another. Each plate includes a complement of silicon springs 13a, 13b that hold a corresponding moving plate 12a, 12b in suspension. Each moving plate provides a surface on which a recording medium or read/write device may be placed.

The micro-mover also includes an X-axis multipole magnet 22a and a Y-axis multipole magnet 22b. Each magnet includes a flux return plate 30 (not shown for the moving plate 10b). The micro-mover assembly is preferably hermetically enclosed in a pair of covers 31 (not shown for the moving plate 10b) which include one or more spacing posts 28 and a seal gasket 29. The two plates also each include one or more contact pads 24a, 24b and associated electrical leads 25a, 25b, a drive coil (of which the Y-axis drive coil 23 for the Y-axis plate is shown in the figure), a torque coil (of which the Y-axis torque coil 21 for the Y-axis plate is shown in the figure), a capacitance bridge position sensor (of which the X-axis capacitance bridge sensor 26 for the X-axis plate is shown in the figure), and one or more Z-capacitors for spacing control. One plate of each Z-capacitor 27 is on the top of the x-axis plate, and the other plate of each Z-capacitor is on the underside of the y-axis plate (not shown in FIG. 2).

One advantage of the embodiment of the invention shown in FIGS. 1 and 2 is that both plates can have nearly identical masses and Z-motion spring constants, such that Z-spacing variation may be minimized by common mode response to Z-perturbations. Thus, control of Z-spacing to a desired tolerance is less difficult to achieve. In contrast, the embodiment of the invention shown in FIG. 3 has the advantage of simplified assembly, using a single large magnet and a fixed plate that facilitates interconnect. However, the embodiment of FIG. 3 does not have common mode rejection of Z-spacing variations that are due to Z-axis shocks. In both embodiments of the invention, read-write elements are located on the surface of one plate with the recording medium on the face of an opposing plate as shown in FIG. 2.

In embodiment of the invention shown in FIGS. 1 and 2, the drive coils 23 can be formed by electroplating, and are preferably located on the outer facing surfaces of the moving plates. In FIG. 2, the drive coil 23 is shown adjacent to a multipole magnet 22b, which produces fields by which current in the drive coil generates a drive force to move the plate 12b.

Current in the drive coils reacts with the field of the permanent magnet to produce a Lorenz force that moves the plate against the force of its suspension springs. In a data storage application, one plate may oscillate in the X-direction at or near resonance, for example at about 1000 Hz. This linear motion corresponds to rotation of a disk in a conventional computer storage disk, and is preferably designed to have a high-Q motion and thereby save power, where Q is the ratio of energy stored per cycle to energy dissipated per cycle.

However, the Q for single crystal silicon structures can be greater than 5000 and may present control problems. To control the Q, an eddy current damping film on the coil side of the plate (not shown), a shunt resistance across the coil (not shown), or both can be used to reduce the Q to about 200. The Q of the opposing plate, moving in the Y-direction, which is analogous to the track seek operation of a conventional disk drive in a data storage application, can also be so limited for better servo position control.

The required length of X- and Y-travel arises from the size of the recording area and the density of the transducer grid in which each transducer accesses a small rectangular area. The Y- axis (i.e. seek axis in a data storage application) must be capable of moving to, and holding position at the extremes of the data block associated with each transducer of the array. However, if the resonant amplitude of the X-axis (i.e. scan axis in a data storage application) is limited to the length of the data block, the velocity at the maximum excursion would be zero. To reduce velocity variation of the data scan, the stroke must be longer than the data block. For example, if the stroke were 1.8 times the length of the data block, velocity variation within the data block would be about 20%, as would the bit spacing of data written at constant frequency.

Figure 3:
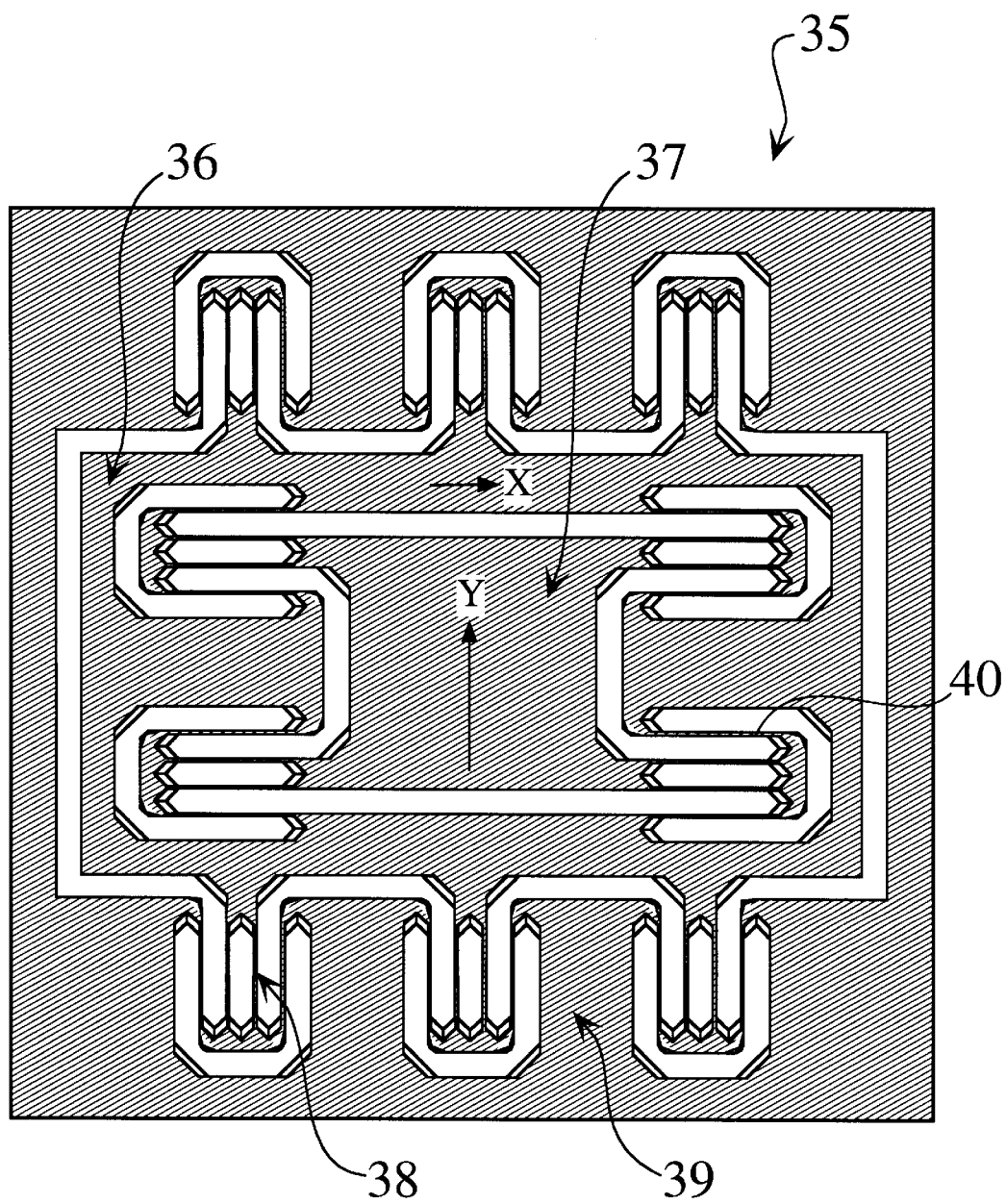
FIG. 3 is a plan view of a compound micro-mover according to an equally preferred embodiment of the invention.

FIG. 3 is a plan view of a compound micro-mover 35 according to an equally preferred embodiment of the invention, in which one moving plate 37 moves in the both X- and Y-directions. The plate is fixedly suspended for Y-axis motion relative to an intermediate, moving frame 36 by a set of Y-axis springs 40; and is fixedly suspended for X-axis motion relative to an outer, non-moving frame 39 by a set of X-axis springs 38.

To generate X-motion in this embodiment, a force is produced on the moving plate in the X-direction by a drive coil (not shown on FIG. 3) that is formed on the bottom of the plate, while Y-motion is achieved by producing a force in that direction from one or more drive coils located on either the intermediate frame 36, or on the moving plate 37. The multipole magnet (not shown on FIG. 3) for X-motion and for Y-motion can be combined into a single magnet having poles that are magnetized in two different orientations. This simplifies assembly and reduces the cost of manufacture. Two advantages of this embodiment are that the non-moving plate does not require flexible electrical connections to the stationary frame 39, and that it has fewer parts. One disadvantage of this embodiment, relative to that of FIGS. 1 and 2, is a lack of common mode rejection for mechanical shock that can cause Z-spacing change between the movable and stationary plates. It is presently thought that the embodiment of FIGS. 1 and 2 is preferred for data storage applications because the control of Z-spacing between read-write elements and the recording medium is a dominating concern.

Required Forces

The micro-mover must provide adequate force to overcome spring forces and the forces of accelerating and moving the mass to achieve the specified access time. For rotating disk storage, access time is composed of latency, i.e. rotational period, and seek time, i.e. time to move transducer between tracks. In the micro-mover device herein described, the equivalent of latency is the period of the resonant axis, if data must be read in the same direction as written. The time required to move between track maxima is the maximum seek time. Latency and maximum seek time for the exemplary micro-mover are specified as 1 msec. Stroke lengths for the mover are determined by the density of read-write transducers and the total recording area.

The minimum area required for the moving plate is determined by dividing the specified data capacity of the storage device by the achievable recording density of the storage medium. Additionally, area must also be added to the moving plate to accommodate sensors, circuitry, and interconnect. A 6 mm square silicon plate has been selected as a representative example. For such plate, the Z-spacing specification might require that the surface of the moving plates be flat to within 10 nm over the recording area (5×5 mm minimum). Although single crystal silicon has inherently low internal stress, stresses expected to be introduced during processing of the medium and read-write transducers require substantial plate stiffness. A thickness of at least 300 $\mu$m is considered essential for adequate flatness in the presence of static, e.g. internal stresses, and dynamic perturbations, such as Z-acceleration. For this example, a conservative plate thickness of 400 $\mu$m with a mass of 35 mg has been chosen.

For a storage device having 4096 transducers, e.g. arranged in a 64×64 array, over a 5 mm square recording area, the minimum travel required is ±39 $\mu$m. With 10000 transducers, e.g. arranged in a 100×100 array, the minimum travel would be ±25 $\mu$m. The stroke required for the exemplary micro-mover is assumed to be ±39 $\mu$m in the seek direction. The resonant direction requires greater travel to reduce velocity variation through the data zone. To limit velocity variation to 20%, travel in the resonant direction must be 1.8 times as large as the data block or ±70 $\mu$m.

For the micro-mover resonant axis, a 1 msec latency requires a resonant frequency of at least 1000 Hz. Assuming a linear spring-mass model, the required spring rate is given by:

$$k_x = m(2\pi f)_2 \qquad (2)$$

For a 35 mg (m=3.5×10$_{-5}$ kg) moving mass and a 1000 Hz resonant frequency f, the spring rate required is 1.38 mN/$\mu$m. For a micro-mover in accordance with the embodiment of FIGS. 1 and 2, having identical resonant and seek axes, the minimum force required to seek a distance of ±39 $\mu$m is 1.38×39, or 54 mN (5.5 gf). Because transit time for limit-to-limit travel is only 0.5 msec, i.e. half the resonant period, the minimum required force is determined by the resonance requirement rather than by the moving plate inertia.

Although inertia does not dominate the force requirement, it is calculated here for purpose of comparison. The velocity profile requiring the smallest force is triangular, i.e. a maximum positive acceleration during the first half of the stroke and the reverse of the remainder of the stroke. Using a triangular profile and ignoring spring forces, the acceleration and force required to move a 35 mg mass over a distance of 78 $\mu$m in 1 msec are 78 m/s$^2$ (~8 G) and 2.73 mN, respectively. The maximum velocity achieved during the move is 0.04 m/sec. For this example, the minimum force required to overcome the springs is about 20 (54/2.73) times greater than the force required to accelerate the inertia. This ratio depends on the resonant frequency, travel distance, and transit time, but not on the mass. However, reducing the mass linearly decreases the force required to overcome the springs.

Fabrication of Plate and Springs

Figure 4:
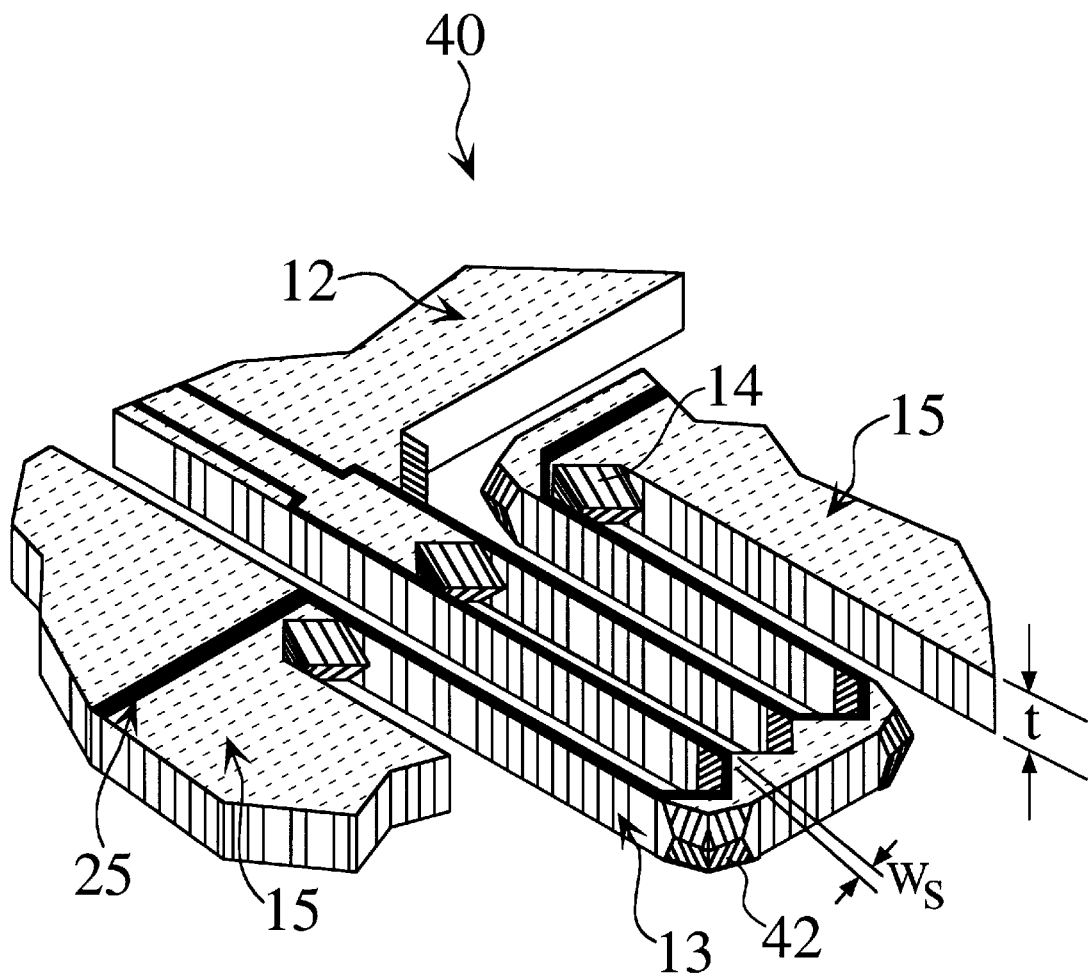
FIG. 4 is a detail perspective view of the (111) and (411) planes of a plate for a micro-mover that is fabricated from a single crystal material according to the invention.

FIG. 4 is a detail perspective view of the (111) and (411) planes of a portion 40 of the plate 10 (FIG. 1) for a micro-mover that is fabricated from a single crystal material according to the invention. In the preferred fabrication method, the moving plate and springs shown in the figure are formed by two-sided etching of single crystal silicon (100) wafer that has been polished on both sides. The mask pattern is transferred by standard lithographic methods to an etch resistant layer on both sides of the silicon wafer. The pattern is oriented on the wafer with the mask openings parallel to the (100) planes (45° to the standard <110> flat) with the front and back images superimposed. An anisotropic etchant such as 30–50 w % KOH in water at 60–100° C., together with an etch resistant layer of low stress CVD SiN is preferred. Etching is continued beyond breakthrough of front and back etch fronts to achieve required spring widths.

At breakthrough, a series of slots through the wafer, defined by (100) planes in the long axis and terminated by four (111) planes at their ends will have been formed. The (111) planes make an angle of 54.7° with the (100) plane of the wafer surface, as well as the slot sides. When a slot makes a right angle turn, two (111) planes define the outside of the turn and a more complex combination of (411) and (other) planes define the inside. FIG. 4 shows a close-up view of the (111) planes 14 and the (411) planes 42. The position of the intersections between (111) planes and the wafer surface are defined by the corners of the mask openings. Prior to breakthrough, and far from the slot ends, the surfaces of the etch groove are formed predominately by three (100) planes that etch at the same rate. Each of the two bottom corners are formed by two small (210) planes. The slot widens twice as fast as it deepens, and because the etch is two sided, the breakthrough width Wb of the slot is given by:

$$W_b = W_m + t \qquad (3)$$

where $W_m$ is the width of the mask opening and t is the wafer thickness. The spring widths Ws at breakthrough are given by:

$$W_s = w - W_m - t \qquad (4)$$

where w is the distance between the centers of the two mask openings in the spring region.

Because final spring widths depend on wafer thickness, mask design must allow for the distribution of this thickness. Controlling final spring dimensions may require end point detection after initial breakthrough. Thickness uniformity both among wafers, and within the same wafer, are important parameters in controlling dimensions.

At breakthrough, top and bottom pairs of (111) planes at the ends of the slots meet at an edge midway through the wafer. As etching continues beyond breakthrough, the edge inverts, i.e. it becomes reentrant, exposing two more (111) planes. Two (111) intersections are formed that invert in a similar fashion.

This etching technique readily produces springs that are 400 $\mu$m deep (wafer thickness t) and 40 $\mu$m or less wide ($W_s$), such that aspect ratios greater than 10:1 are attainable. A large aspect ratio is important for springs that are compliant in the direction of motion but stiff in the direction perpendicular to the plane of the moving plate. In the direction of motion, the spring constant varies as the third power of $W_s$ and varies linearly with t. Whereas, the spring constant in the Z-direction varies as the third power of t and varies linearly with $W_s$. The ratio of spring constants is thus:

$$\frac{K_2}{K_x} = \frac{t^2}{W_s^2} \quad (5)$$

If t is 400 µm and $W_s$ is 40 µm, then $K_z/K_y$ is equal to 100.

Fracture Strength of Silicon

Fracture strength and fatigue characteristics of single crystal silicon are critical to the reliable operation of the silicon spring structure described above. Theoretical cohesive strength of single crystal silicon is approximately 30 GPa depending on its crystalline orientation. Experimentally determined fracture strengths reported in the literature (see Johansson et al. ibid.; and K. Yasutake, M. Iwata, K Yoshii, M. Umeno, H. Kawabe, *Crack Healing and Fracture Strength of Silicon Crystals*, J. Mater. Sci., 21, pp. 2185–2192 (1986)) range from 50 MPa to 10 GPa, depending on such factors as test geometry, method of fabrication, and sample size. This variation arises from the intrinsic fracture mechanics of single crystal silicon, where strength is determined predominately by surface and near surface defects. Because the probability of critical defects is reduced for small structures, such structures can more closely approach theoretical strength. The fabrication method is important to controlling defects and micro-geometry that affect fracture strength.

A simplified spring and plate geometry was analyzed by finite element analysis that predicted a maximum von-Mises stress of 122 MPa at a displacement of 70 µm. Maximum stress in the actual structure is higher because the stress concentration caused by the intersection of the two (111) planes with the (100) side wall at the root of each spring was not included in the model. Nonetheless, this value is at the low end of observed silicon fracture strength.

Fracture strength depends upon part geometry, test geometry, and the load at fracture. For the micro-mover herein described, displacement at fracture is the primary concern. Measurements were made of the displacement at which fracture occurred using resonant AC excitation. Fracture occurred form displacements of from 180 to 200 µm. This gives a safety factor of between 2.5 and 3.0. The lower bound for fracture strength based on the simplified finite element model and the observed fracture displacement is about 300 MPa.

Actuator Design

Figure 5:
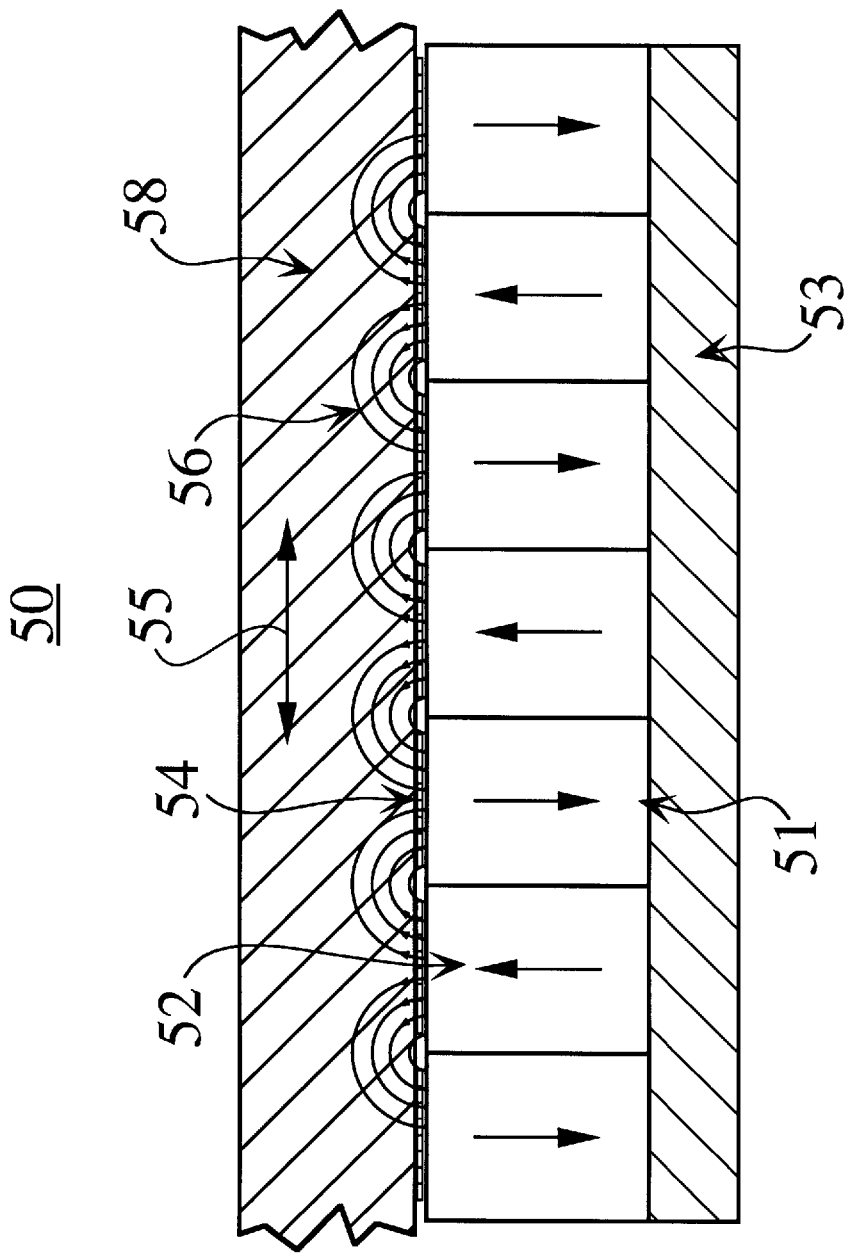
FIG. 5 is a sectioned schematic view of a linear motor design for a micro-mover according to the invention.

FIG. 5 is a sectioned schematic view of a linear actuator design 50 for an electromagnetic micro-mover according to the invention. Alternating magnetic poles, preferably magnetized into a monolithic magnet 51 that includes an associated flux closure plate 53, produce the external fields 56 schematically shown in the figure. Conductors 54, located in a plane parallel to the magnet 51, are arranged so that each group is centered adjacent to a magnet pole 52. Because the current direction is opposite in adjacent groups, as are the polarities of the magnet poles, they produce a unidirectional force.

The net force 55 applied to the moving plate 58 is parallel to the plate and through the conductor centers. Motion is limited to the difference between the coil bundle width $W_{CB}$ and the magnet pole width Wp. In practice, the difference, $W_D = W_p - W_{CB}$, is larger than the required travel to minimize nonlinearity. The selection of $W_D$ is a compromise between actuator linearity and efficiency. If high energy product magnets are used, such as NdFeB, and if the coil conductors are spaced closely to the pole surfaces, then substantial forces can be produced.

The magnetic force in SI units is given by:

$$F = BLIN \quad (6)$$

where B is the magnetic field around the conductors, L is the length of the conductors, I is the current, and N is the number of conductors in the field. Typical values are B=0.6 Tesla, L=0.005 m, I=0.2 Amp, and N=100. These values produce a force of F=60 mN.

As the pole width Wp is decreased, the required size and field range of the magnet is also decreased. A ratio of 1:2 for pole length (or thickness, in the case of a monolithic magnet) divided by pole width, is readily feasible with NdFeB or CoSm magnets. The magnet required for the micro-meter should be thinner than the mover thickness, preferably 300 µm or less. For a 300 µm thick magnet, pole width should be no larger than 600 µm. Optimal selection of pole width is based on the following partial list of factors: efficiency, required field extent, required magnet size, magnet energy product, and magnet-to-coil spacing.

Drive Coils

Figure 6:
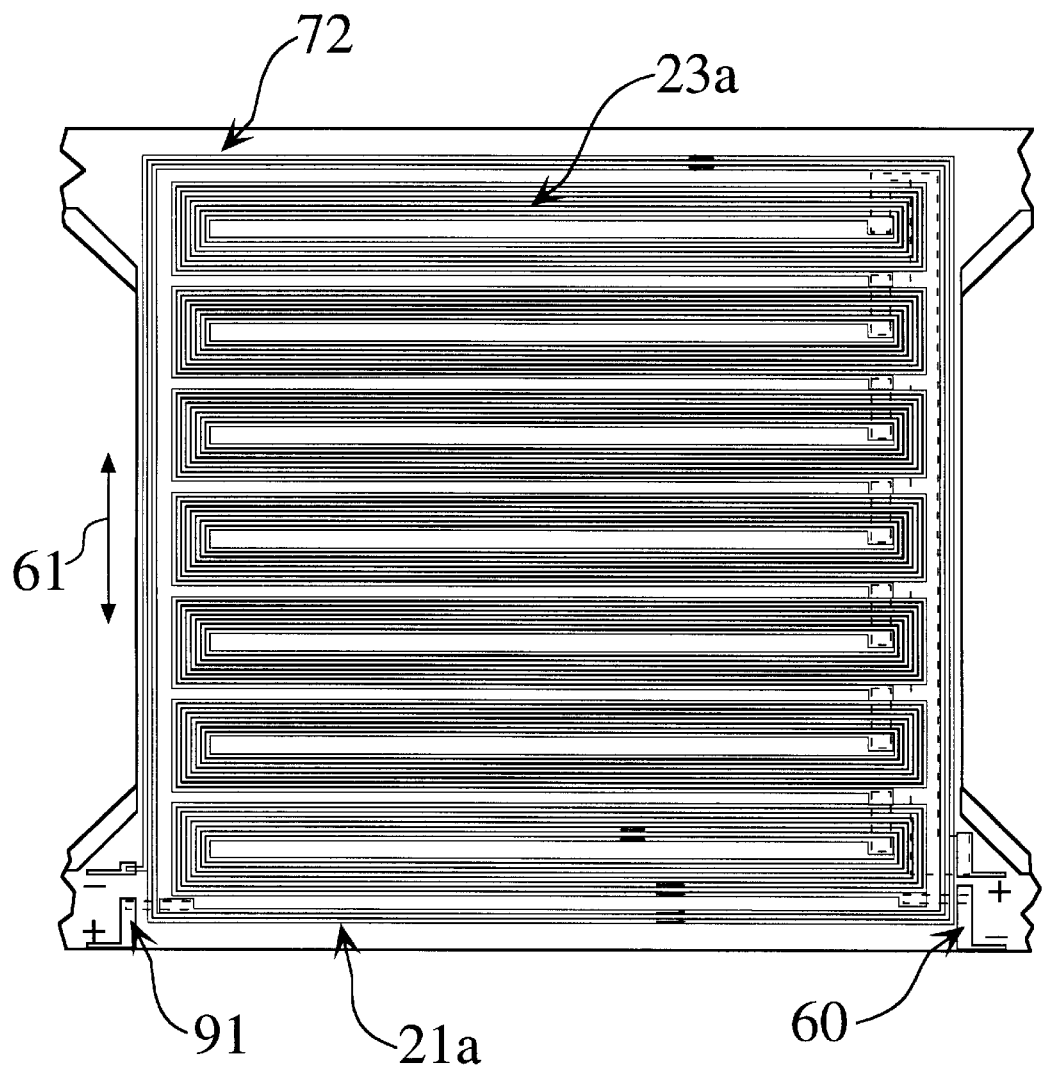
FIG. 6 is a plan view of a symmetric driver coil and torque coil for a micro-mover according to the invention.

FIG. 6 is a plan view of a symmetric drive coil 23a for a micro-mover plate 12 according to the invention. The plate 12 also includes a torque coil 21a (discussed below). The current, supplied to the coil through the electrical leads 60, in alternate bundles of conductors flows in opposite directions in the coil 23a. The embodiment of the invention shown in FIGS. 1 and 2, which has two moving plates, uses this design for both axes. Motion of the plate shown in the figure is indicated by the arrow identified by the numeric designator 61.

Figure 7:
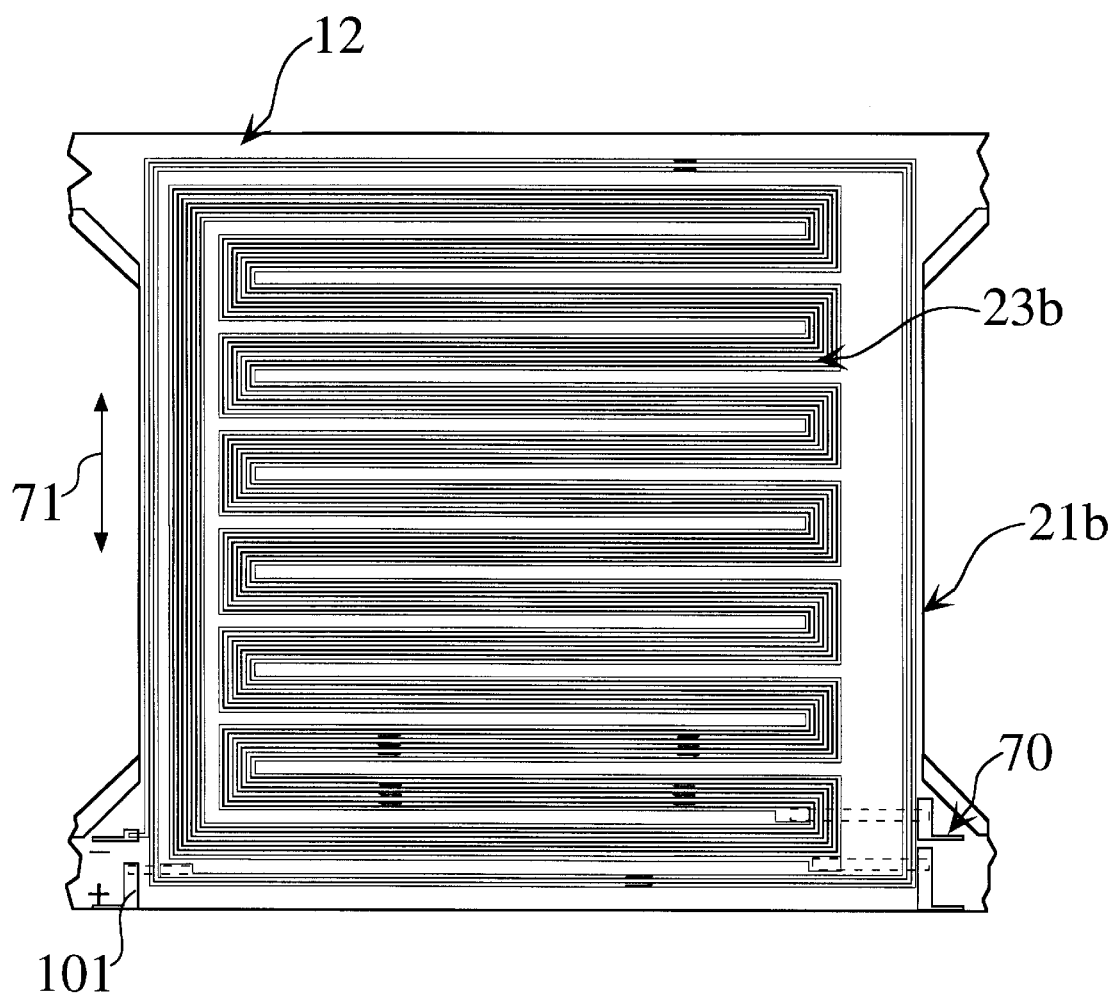
FIG. 7 is a plan view of an asymmetric driver coil and torque coil for a micro-mover according to the invention.

FIG. 7 is a top plan view of an asymmetric driver coil 23b for a micro-mover according to the invention, whose efficiency is equivalent to the symmetrical design, if it is offset to make its force act through the center of the plate. Current is supplied to the coil 23b through electrical leads 70. Motion of the moving plate 12 shown in the figure is indicated by the arrow identified by the numeric designator 71. The plate 12 also includes a torque coil 21b (discussed below).

Torque Coil

Figure 8:
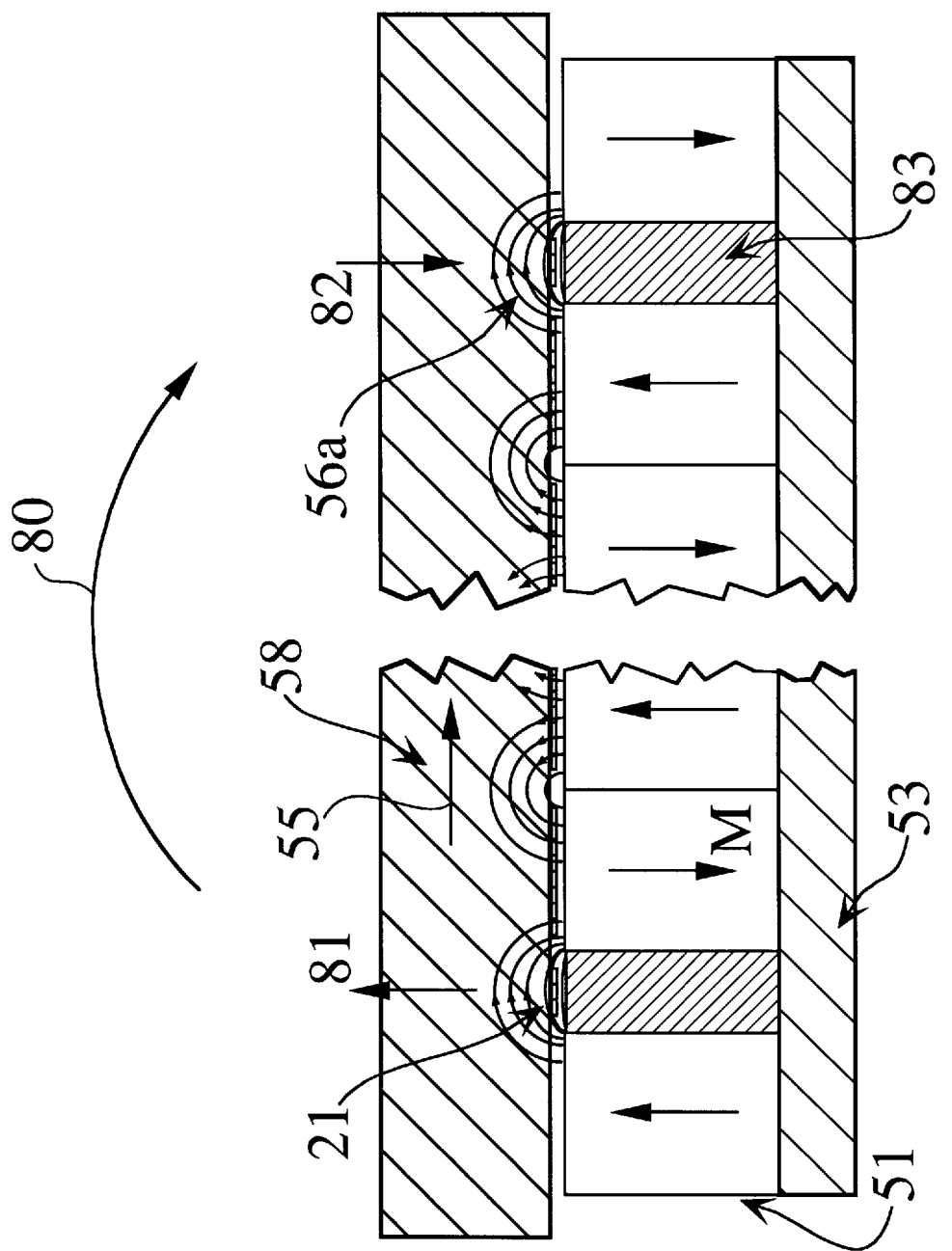
FIG. 8 is a sectioned schematic view showing torque compensation for a micro-mover according to the invention.

FIG. 8 is a sectioned schematic view showing torque compensation for a micro-mover according to the invention. The force 55 produced by the magnetic field 56 shown in the figure is applied to coils on the plate 58 surface that are a half plate thickness offset from center of mass, and to its spring attachments that also lie on the central plane of the plate. This offset causes an unwanted torque for which a torque compensating coil 21 is provided.

The torque coil 21 and torque magnet poles are spaced so that the coil resides in a magnetic field 56a that is oriented parallel to the motion, with a polarity that gives a resulting force F1 (81) upward on the left of the torque coil and downward F2 (82) on the right, or the converse when the current and motion is reversed. The forces F1 and F2 produce a correction torque 80 that can be adjusted to cancel unwanted torque by the offset of the drive coil by choosing an appropriate ratio and polarity to the current in the drive coil. The shape and location of the conductors connecting the active runs of the torque coil is unimportant. Various connecting conductor arrangements can be used in the scope of this invention. The region 83 of the magnet is not significantly magnetized so the required field 56A can be obtained FIG. 6 shows a torque correction coil 21a, and leads 91 therefor, for a symmetric driver coil 23a in a micro-mover according to the invention; and FIG. 7 shows a torque coil 21b for an asymmetric driver coil 23b, and leads 101 therefor, in a micro-mover according to the invention.

Magnets

A multi-pole monolithic magnet is the preferred design for the micro-mover herein described. The required magnet pole structure exceeds the capabilities of standard approaches to magnetizing multi-pole magnets. Two types of magnetizing structures may be used to magnetize the desired pole structure into the magnet, both of which are two pole designs. In the first design, single poles and single turn drive coils are located on opposite faces of the magnet. Poles are written one-at-a-time through the material with alternating polarity. The step size is adjusted when writing the outside poles to produce the neutral gaps required for the torque coil. This method has produced a pole structure with 300 $\mu$m pitch in a 300 $\mu$m thick magnet.

An alternative magnetizing structure locates two 290 $\mu$m poles side-by-side on the same side of the magnet with a gap of 20 $\mu$m, such that two magnet poles at a time are written into the material. A second pole structure, having a wider spacing, must be used to write the poles of the torque compensation coil. The advantage of this second approach is that the magnet does not require a magnetically soft flux return plate. The disadvantage of this approach is that a second pole structure is required to write the torque compensation poles.

Magnet material selection is governed by energy product, temperature stability, and machinability. The higher energy product and demonstrated ability to fabricate magnets to the required size make NdFeB the preferred material, although other materials, such as CoSm, may also be used.

X- and Y-Position Sensors

Figure 9B:
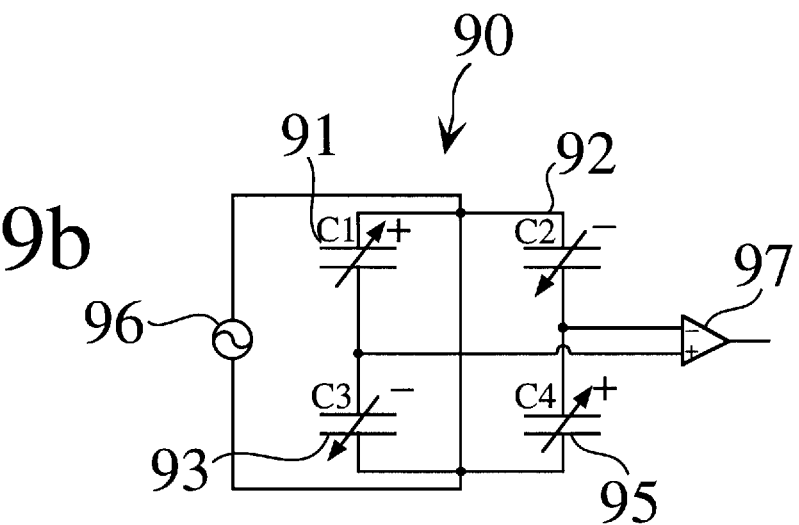
Figure 9A:
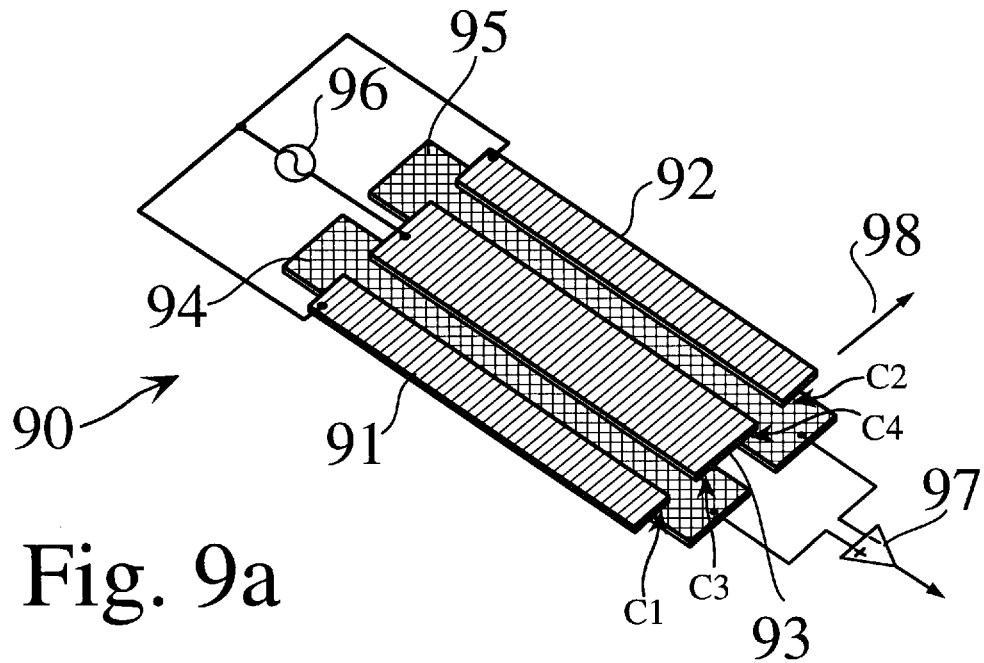
FIG. 9a is a partial schematic diagram/perspective view of a capacitance bridge position sensor according to a preferred embodiment of the invention.

FIG. 9a is a partial schematic diagram/perspective view of a capacitance bridge position sensor 90 according to a preferred embodiment of the invention; and FIG. 9b is a schematic diagram of the capacitance bridge position sensor of FIG. 9a. The relative position of the mover plate in the track seek Y-direction, or scan X-direction, can be sensed by a capacitance bridge (C-bridge). The bridge is designed to change its capacitance only with relative parallel plate motion contributing to the output signal, while Z-changes are ignored. Thus, the capacitances C1 (91) and C4 (95) increase when the capacitances C2 (92) and C3 (93) decrease for a particular plate motion, as shown on the figure by the arrow identified by the numeric designator 98. This arrangement maximizes the signal to noise ratio of the X- or Y-position signal. The capacitance bridge is driven by a signal source 96. A differential capacitance value is provided to an output buffer 97 to produce a signal that is indicative of relative plate position.

Figure 10C:
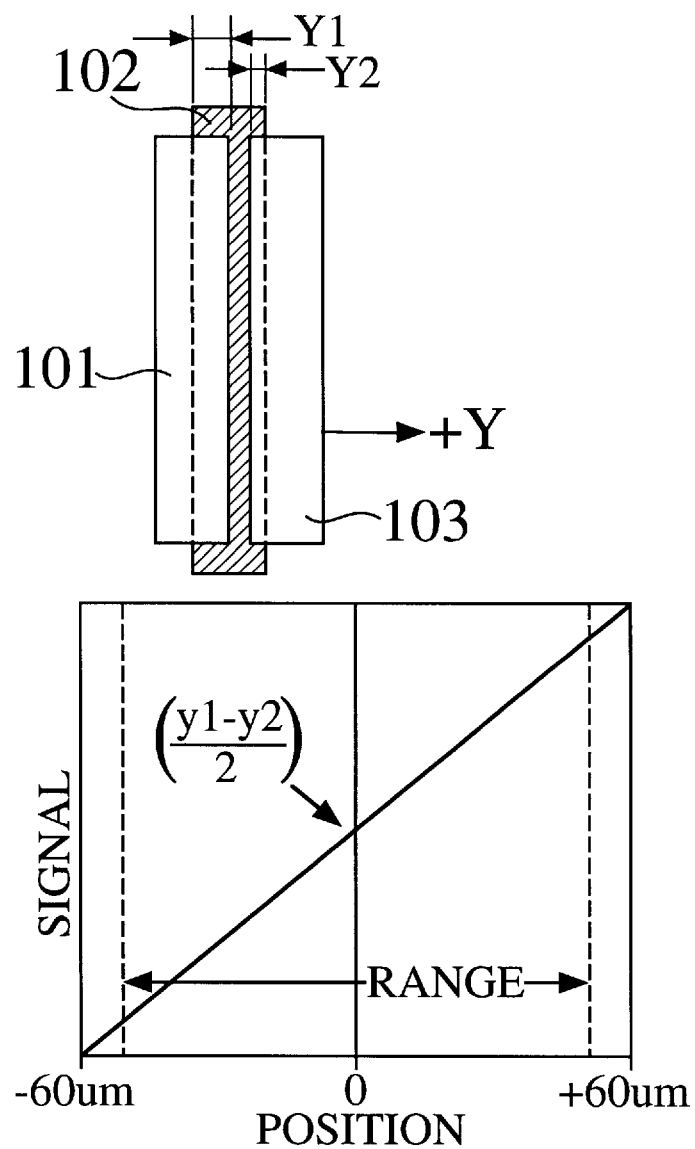

FIG. 10a is a partial schematic diagram/perspective view of a capacitance position sensor 100 according to an alternative, equally preferred embodiment of the invention; FIG. 10b is a schematic diagram of the capacitance position sensor of FIG. 10a; and FIG. 10c is a graph plotting signal strength versus plate position for a micro-mover that incorporates the capacitance position sensor of FIG. 10a. As shown in FIG. 10a, two overlapping capacitors C1 and C2 are formed on two of the moving plates. When one plate moves, the capacitance of C1 increases and the capacitance of C2 decreases, and vice versa. The two capacitors are connected to two respective timer circuits 105, 106, which may be a 555 timer. Each timer has an associated resistor having a resistance R. When the capacitance of a capacitor associated with a timer is changed, the output frequency changes. In the preferred embodiment of the invention, the period of each output of each timer is measured, and the periods are then combined.

A third timer 107 is also provided that has the same stray capacitance as the bridge capacitors 101, 104, but no moving plates, i.e. it is a dummy capacitor/timer. Instead of measuring the output frequency, the period of the output oscillation is measured. Thus, the capacitance of the overlapping plates is converted to an AC signal by its associated timer. The output periods $T_1$ and $T_2$ of these signals are used because they vary linearly with plate position y. The third timer is used to cancel the effects of stray capacitance, as described below. The periods $T_1$, $T_2$, and $T_3$ are given by:

$$T_1 = R/k_o(C_1 + C_{o1}) \tag{7}$$

$$T_2 = R/k_o(C_2 + C_{o2}) \tag{8}$$

$$T_3 = 2R/k_o(C_{o3}) \tag{9}$$

where R is the timer resistance, $K_o$ is the frequency constant of the timers, and $C_{o1}$, $C_{o2}$, and $C_{o3}$ are the stray capacitances of the three timer inputs. The capacitances $C_1$ and $C_2$ of the overlapped plates is given in SI units by:

$$C_1 = W(Y_1 + Y)/Kd \tag{10}$$

$$C_2 = W(Y_2 - Y)/Kd \tag{11}$$

where $Y_1$ and $Y_2$ are the initial plate overlap distances, Y is the position change of the two top plates, d is the spacing between the top and bottom plates, and K is $36 \ast 10_9$ PI, which is equal to 1 divided by $e_0$, the permitivity of free space. The periods are thus:

$$T_1 = \frac{RW(Y_1 + Y)}{K_0 Kd} + \frac{RC_{01}}{k_0} \tag{12}$$

$$T_2 = \frac{RW(Y_2 - Y)}{K_0 Kd} + \frac{RC_{02}}{K_0} \tag{13}$$

The periods are combined in a unique way to produce a signal S:

$$S = \left(\frac{T_1 - T_2}{T_1 + T_2 - T_3}\right)\left(\frac{Y_1 + Y_2}{2}\right) \tag{14}$$

or:

$$S = \frac{\frac{RW}{K_0 kd}(Y_1 - Y_2 + 2Y) + \frac{R}{K_0}(C_{01} - C_{02})}{\frac{RW}{K_0 Kd}(Y_1 + Y_2) + \frac{R}{K_0}(C_{01} - C_{02} - 2C_{03})} \left(\frac{Y_1 + Y_2}{2}\right). \tag{15}$$

If $C_{o1}$, $C_{o2}$, and $C_{o3}$ are all equal, then:

$$S = (Y_1 - Y_2)/2 + Y \tag{16}$$

The signal S is linear in Y with a fixed offset $(Y_1-Y_2)/2$. The parameters R, W, $K_o$, and the distance d have all canceled out, as well as well as have the stray capacitances. Thus, a variation in spacing d does not change the signal. This signal is plotted in FIG. 10c for the example $Y_1=180\,\mu$m and $Y_2=60\,\mu$m. This produces a signal:

$$S = 60 + Y \tag{17}$$

having a usable range of slightly less than +/−60 $\mu$m. At +60 $\mu$m, the $C_2$ overlap goes to 0; and at −60 $\mu$m, $C_1$ and $C_2$ become equal and S goes to 0.

For proper operation, the parameters must be constant, or vary the same with temperature and time. Thus, the three timers should preferably be on the same silicon chip, and the resistors should be of identical type, be thermally linked, and be stable with temperature. The stray capacitances must also track with temperature and time so they remain equal.

Figure 11:
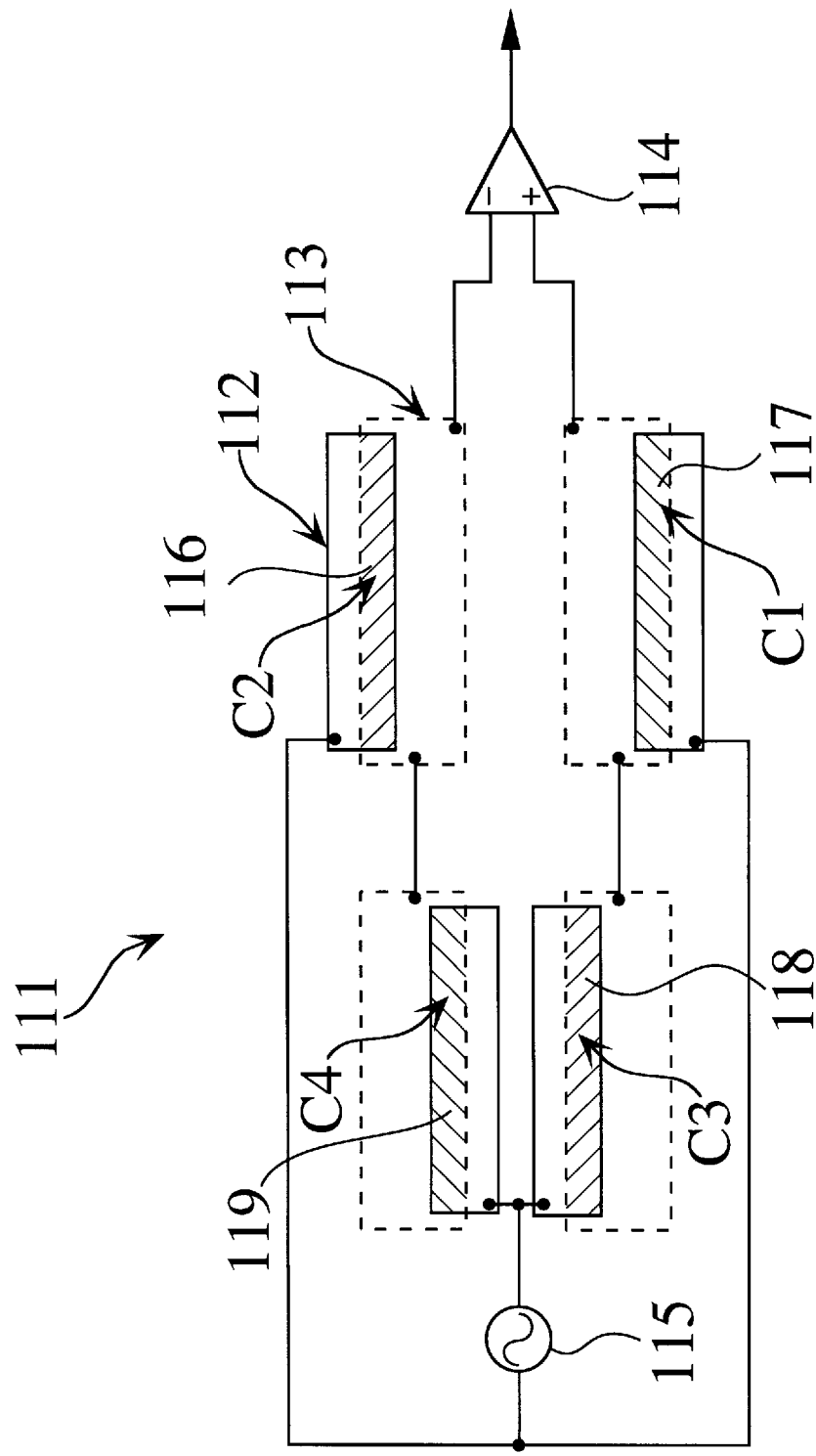
FIG. 11 is a partial schematic diagram/top plan view of a capacitance bridge position sensor according to another, equally preferred embodiment of the invention.

FIG. 11 is a partial schematic diagram/top plan view of a capacitance bridge position sensor 111 according to another, equally preferred embodiment of the invention. The bridge configuration is a variation of the design shown in FIG. 9a, but it is not as compact. The bridge is driven by a signal source 115 and the output is sensed by a differential amplifier 114.

Z-spacing Control

Figure 12:
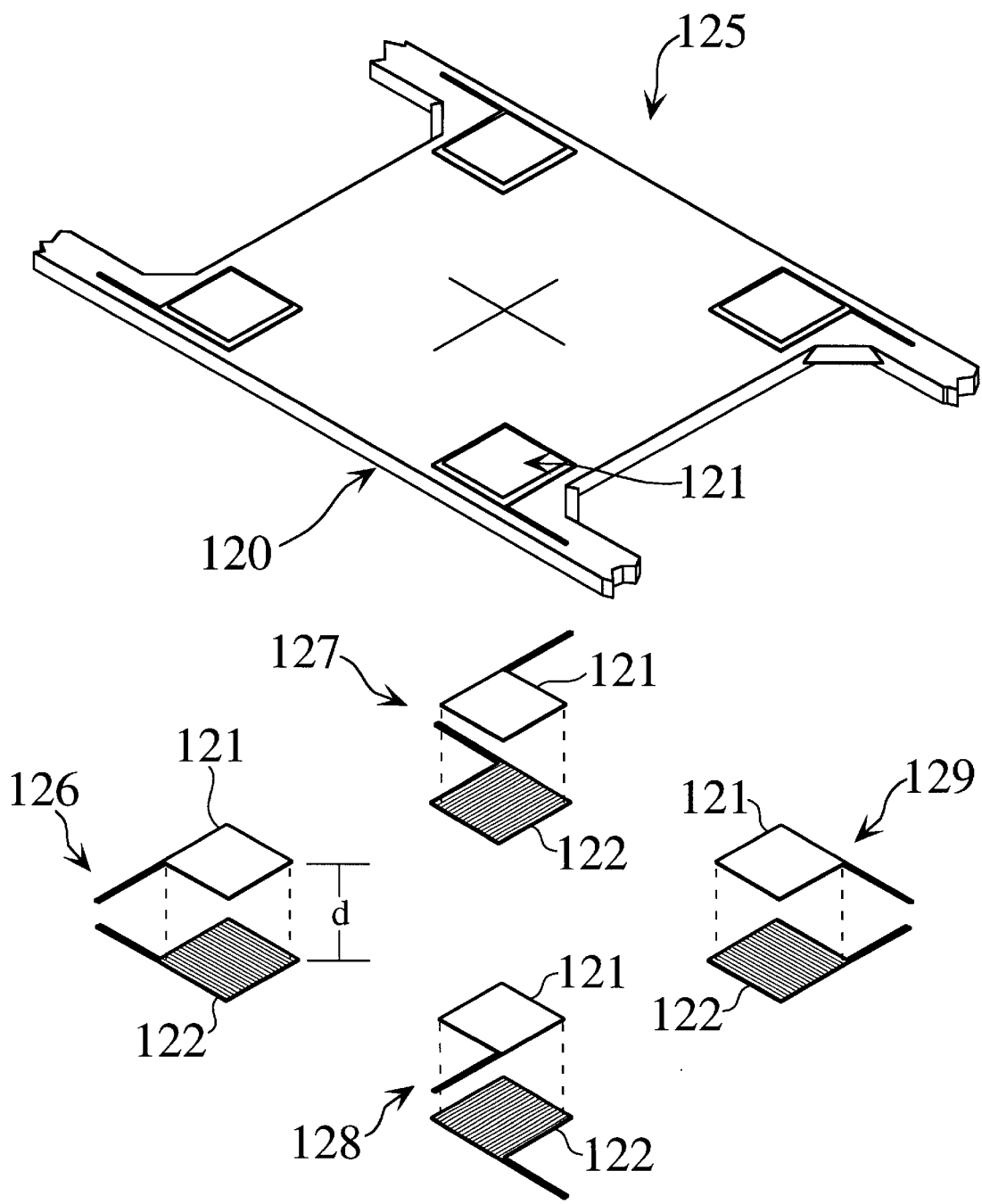
FIG. 12 is a perspective view of a capacitor structure that is used to generate Z forces in a micro-mover according to the invention.

FIG. 12 is a perspective view of a capacitor structure 125 that is used to generate Z forces in a micro-mover according to the invention. The Z-spacing between the mover plates (only the bottom plate 120 is shown in the figure) is controlled by means of four forcing capacitors 126–129. The top capacitor plates are formed on the bottom of the top moving plate (not shown). The capacitors have diagonal symmetry and are located on facing surfaces of the mover. Applying a common voltage to these capacitors produces an attractive force that pulls the capacitor plates 121, 122, and therefore the moving plates, closer together with a stroke of up to 0.4 $\mu$m against the Z-stiffness of the support springs. When not energized, the plates pull apart and prevent the read-write elements from striking the medium in the event mechanical shock. To the first order, the plates in the embodiment of the inventions shown in FIGS. 1 and 2 preferably move in common in the Z-direction maintaining constant spacing. However, because Z-spring constants cannot be perfectly matched some spacing change may occur. The Z-capacitors are located in the four corners of the plate in this design, leaving the central area for recording.

Figure 13:
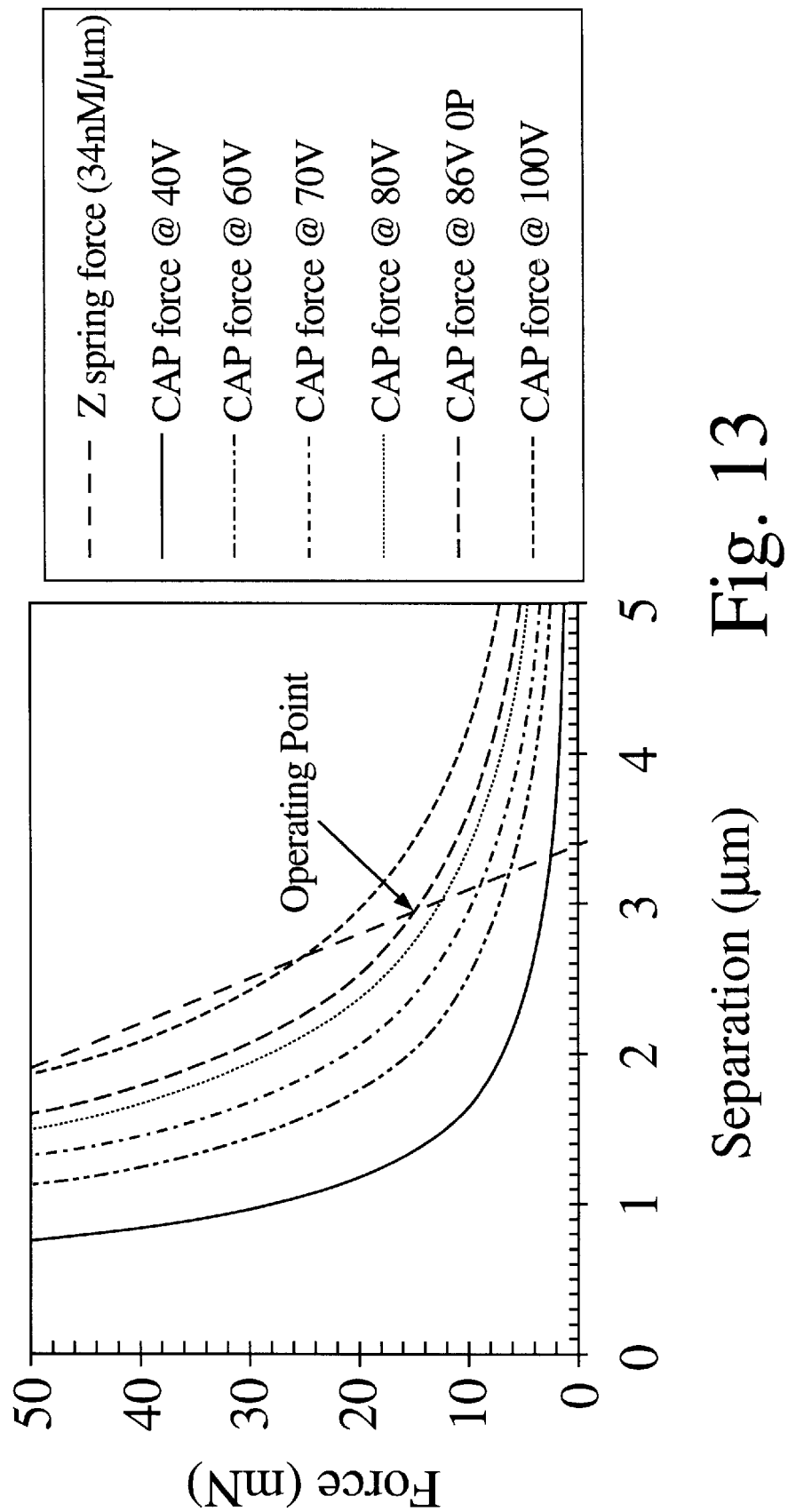
FIG. 13 is a graph plotting capacitor and spring force as functions of capacitor separation and voltage for four 1 mm$^2$ capacitors formed between opposing micro-mover plates according to the invention.

FIG. 13 is a graph plotting capacitor and spring force as functions of capacitor separation and voltage for four 1 mm$^2$ capacitors formed between opposing micro-mover plates according to the invention. The figure also shows the absolute differential spring force as the plates are moved from the neutral separation, 3.4 $\mu$m in this example. As voltage is applied, the capacitors draw the plates together until equilibrium is achieved.

Figure 14:
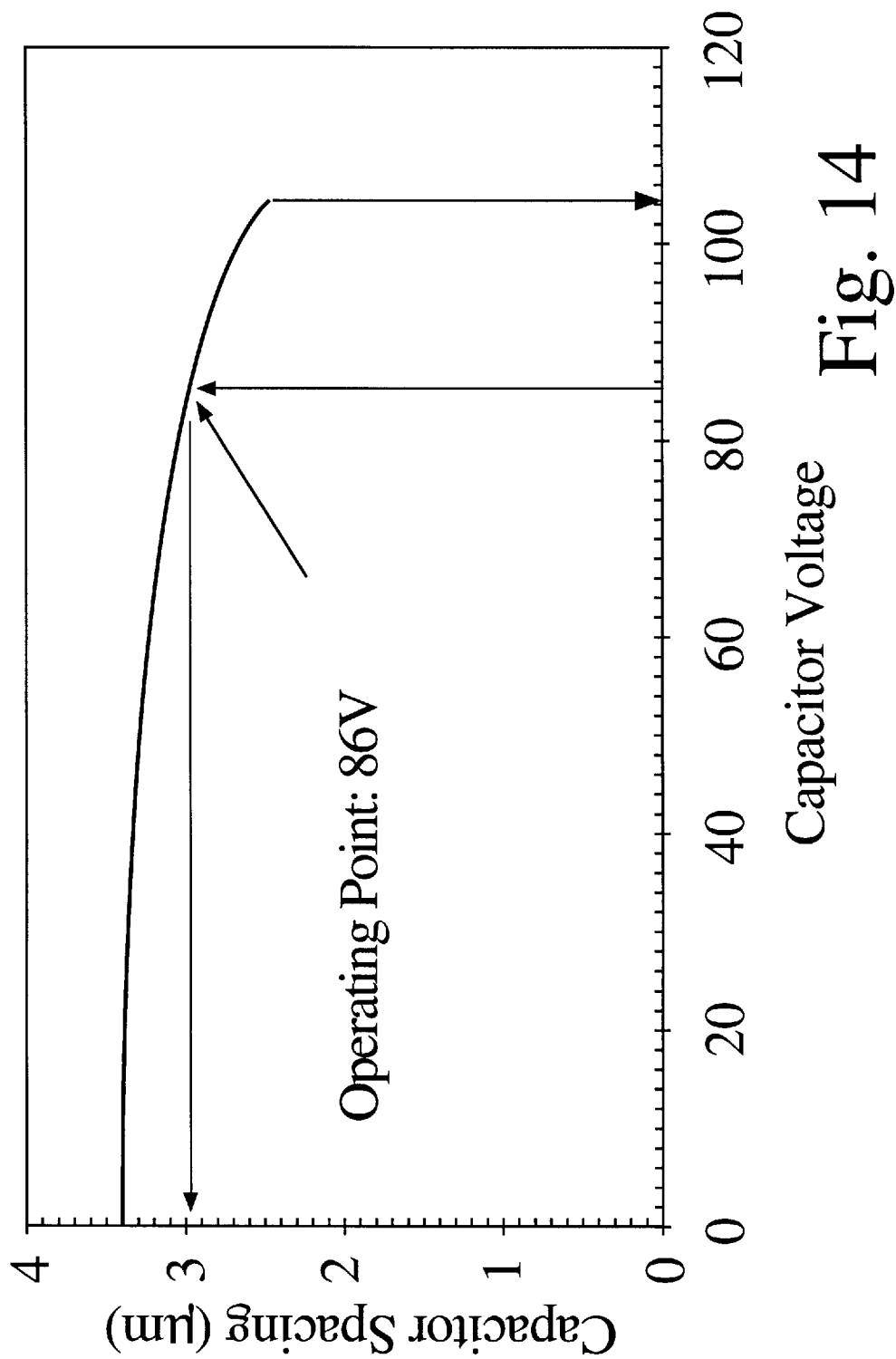
FIG. 14 is a graph plotting capacitor separation of opposing micro-mover plates as a function of capacitor voltage for four 1 mm$^2$ capacitors formed between said plates according to the invention.

FIG. 14 is a graph plotting capacitor separation of opposing micro-mover plates as a function of capacitor voltage for four 1 mm$^2$ capacitors formed between said plates according to the invention. As the voltage is increased, the plates are pulled closer together n a non-linear manner. At 102.2 volts, the plates are pulled together irreversibly. The operating point must be well below 102.2 volts for this example.

Figure 15:
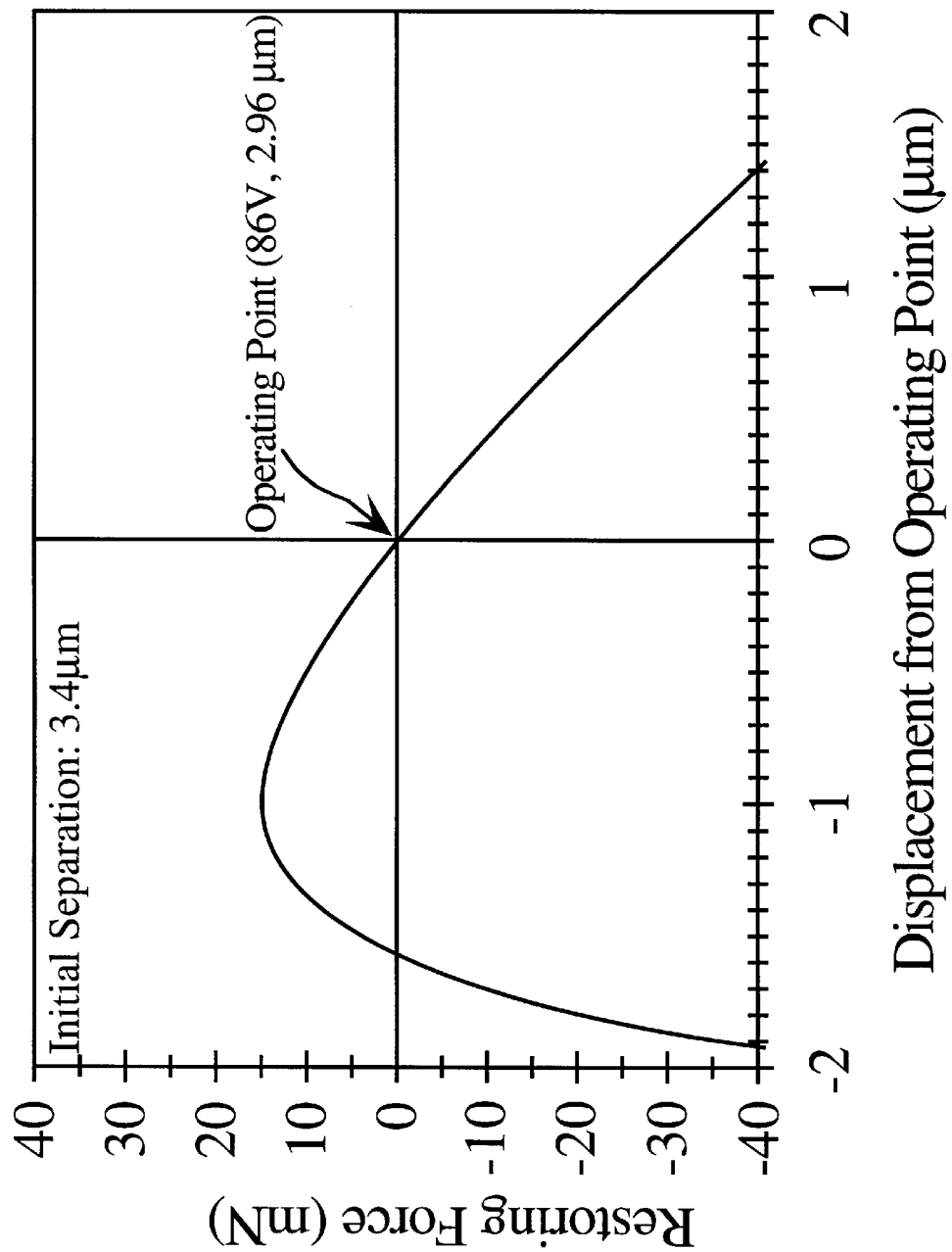
FIG. 15 is a graph plotting restoring force versus differential Z-displacement for opposed micro-mover plates at the operating equilibrium between restoring springs and four 1 mm$^2$ capacitors held at 86 V according to the invention.

FIG. 15 is a graph plotting restoring force versus differential Z-displacement for opposed micro-mover plates at the operating equilibrium between restoring springs and four 1 mm$^2$ capacitors held at 86 V according to the invention. The figure shows that the spring spacing rate is reduced slightly by the nonlinear force of the capacitors when they draw the plates together.

Z-spacing Sensors

The same capacitors used for Z-spacing control, can be used to sense the spacing between the moving plates. This can be done by superimposing a high frequency voltage on the control voltage used to produce the Z-force. Alternatively, a signal from the read-write elements can be used to sense changes in spacing between the plates.

Symmetric Z-Capacitors

Figure 16:
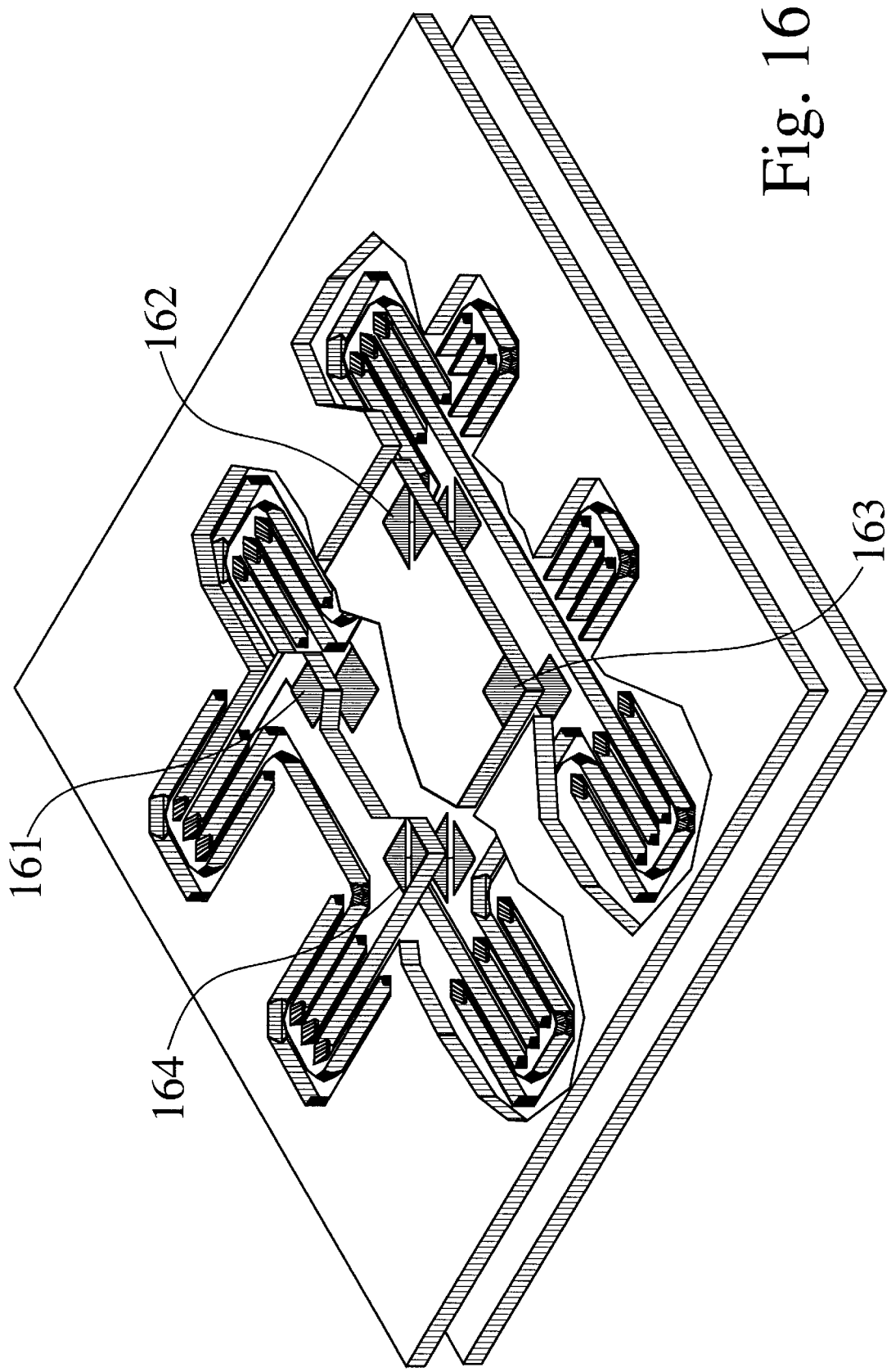
FIG. 16 is a perspective view of symmetrical Z-force capacitor structures for a micro-mover according to the invention.

FIG. 16 is a perspective view of symmetrical Z-force capacitor structures 161–164 for a micro-mover according to the invention. The top plate in FIG. 16 is shown cut away to make the bottom plate more visible. Two of the four capacitors 161, 163 are composed of solid square plates, one larger plate and one smaller plate. The other two capacitors 162, 164 are composed of composite plates that have a large right triangle and a small right triangle connected by a small link. This design has the correct diagonal symmetry to allow two identical moving silicon plates to be used together, one for x motion and one for y motion. In assembly, one mover is rotated 90° and flipped over, such that the capacitor plates face each other, as shown in the figure. The top and bottom capacitor plates are different sizes so the capacitance does not change as the x or y position changes.

Separation Gasket

FIG. 2 shows a bottom plate 31 having a gasket 29 and a plurality of posts 28 that control plate spacing and that form a vacuum seal for a micro-mover according to the invention. A substantially identical top plate (not shown) is also provided to complete the micro-mover assembly. Both plates include gaskets that are made with very nearly equal thickness to space the plates apart the desired amount, and to allow the plates to be bonded together. The posts support the assembly to mitigate the force placed on the assembly through the atmospheric pressure in the center part. In the preferred embodiment of the invention, the interior of the assembly is evacuated, and the posts help hold off the force of atmospheric pressure that tries to squeeze the plates together.

Thus, the silicon frames of the two plates are preferably separated by a deposited gasket and post design. The gasket material can be a metal such as copper or gold with a thin indium film to enable bonding the plates together with accurate parallel spacing for the moving plates, e.g. for the embodiment of the invention shown in FIGS. 1 and 2. For this, the gasket material must have suitably controlled thickness uniformity.

Electrical Conductor Bridges

In FIG. 4, a perspective view of a plate 40 shows electrical leads on spring structures 13 in a micro-mover according to the invention. Electrical leads 25 to the drive and torque coils can be routed over the silicon springs 13 from the non-moving frame 15 to the moving plate 12. The C-bridge and Z-spacing capacitor leads can be routed similarly on the opposite side of the springs. Other electrical leads, such as leads from the read and write elements can also be routed over springs that are not already occupied by coil and capacitor conductors. For additional conductors, more silicon springs could be added if all springs are reduced in thickness to maintain plate resonant frequency. However, this would be done at the expense of increased size or reduced recording space to make room for electronic components.

Figure 17:
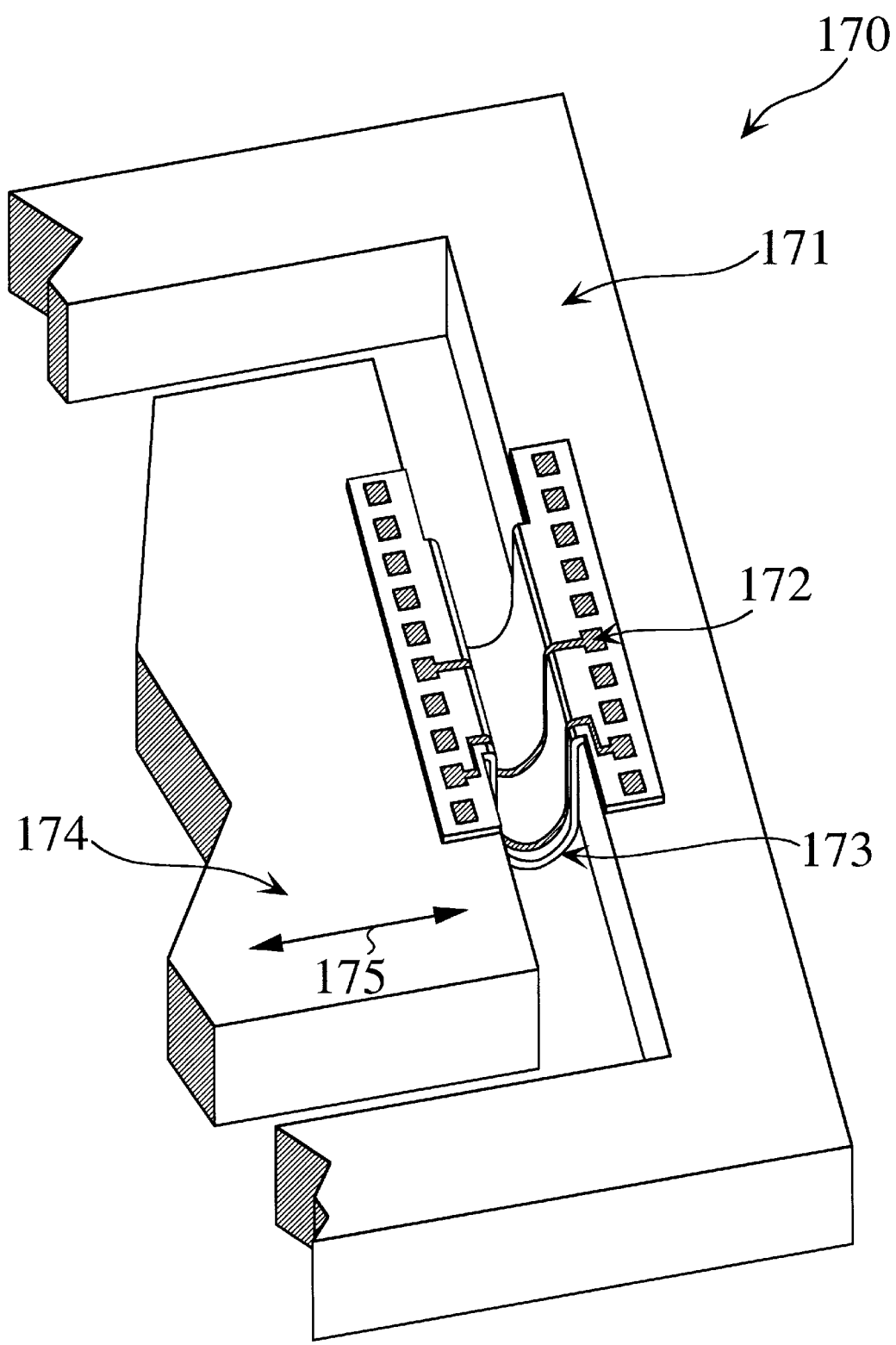
FIG. 17 is a perspective view of an umbilical cable for a plate in a micro-mover according to the invention.

FIG. 17 is a perspective view of an umbilical connector 172, 173 for a plate 170 in a micro-mover according to the invention. As shown in the figure, thin leads 172 are deposited on a sheet of flexible insulator 173, such as Kapton, that spans the gap between a fixed plate 171 and a moving plate 174 (motion is shown by the arrow identified by the numeric designator 175). The umbilical connector must be thin enough not to affect the Q of the moving plate excessively or cause erratic motion by its spring constant and/or resonant frequency.

Although the invention is described herein with reference to the preferred embodiment, one skilled in the art will readily appreciate that other applications may be substituted for those set forth herein without departing from the spirit and scope of the present invention. For example, a mirror may be placed on the moving plate with a laser pointed at the mirror. This embodiment of the invention is used to redirect the laser beam or to change the link beam down in optoelectronic applications, or in a microinterferometer. Another embodiment of the invention provides a single plate that can be moved in both X- and Y-directions. This embodiment of the invention employs a single spring, instead of a folded spring, with one composite magnet placed underneath the plate, and coils that drive the plate to move in both directions. This embodiment of the invention may be used for such applications as a microscope stage or for electronic applications where micromirrors must be accurately positioned, i.e. this embodiment of the invention provides a general purpose movable stage. Accordingly, the invention should only be limited by the Claims included below.

We claim:

1. A micro-mover, comprising:

two closely spaced silicon plates, at least one of said plates including integral suspension springs that support a moving plate portion; and means for driving said moving plate portion by planar electromagnetic actuation so as to effect a reciprocal movement of said two plates relative to each other in both an X-direction and a Y-direction, said Y-direction being substantially transverse to said X-direction.

2. The micro-mover of claim 1, comprising:

two substantially identical, closely spaced silicon plates, wherein a first of said plates is adapted for movement in an X-direction, and wherein a second of said plates is adapted for movement in a Y-direction.

3. The micro-mover of claim 1, comprising:

a first, stationary silicon plate; and a second silicon plate comprising compound springs that are adapted to allow said plate to move in both an X-direction and a Y- direction, relative to said first, stationary plate.

4. The micro-mover of claim 1, wherein said integral springs comprise:

a symmetric folded spring configuration, including a spring formed at each corner or on at least two sides of said moving plate.

5. The micro-mover of claim 1, comprising at least two silicon plates that are assembled facing each other, closely spaced and parallel, having axes of motion at 90° apart.

6. The micro-mover of claim 1, wherein said moving plate provides a surface upon which a recording medium and/or a read/write device may be placed.

7. The micro-mover of claim 1, said means for driving further comprising:

at least one of an X-axis multipole magnet, a Y-axis multipole magnet, and a combination X-axis/Y-axis multipole magnet.

8. The micro-mover of claim 7, said multipole magnet further comprising: a flux return plate.

9. The micro-mover of claim 1, further comprising: one or more covers for hermetically enclosing said micro-mover.

10. The micro-mover of claim 9, said one or more covers further comprising: one or more spacing posts; and a seal gasket.

11. The micro-mover of claim 1, said plate further comprising: one or more contact pads and associated electrical leads.

12. The micro-mover of claim 7, said means for driving further comprising:

at least one drive coil for effecting plate motion, wherein current in said drive coil reacts with a magnetic field developed by said magnet to produce a force that moves said plate against the force of said plate suspension springs.

13. The micro-mover of claim 12, wherein said drive coil is a symmetric coil.

14. The micro-mover of claim 12, wherein said drive coil is an asymmetric coil.

15. The micro-mover of claim 7, said magnet further comprising:

alternating magnetic poles magnetized into a monolithic magnet structure.

16. The micro-mover of claim 1, said means for driving further comprising:

at least one torque coil for producing a correction torque to cancel unwanted torque produced by said drive coil.

17. The micro-mover of claim 1, further comprising:

at least one capacitance position sensor, adapted to change capacitance with relative parallel plate motion, and for producing an output signal in accordance therewith, wherein said position sensor is insensitive to motion in an orthogonal axis and relative plate spacing.

18. The micro-mover of claim 17, said capacitance position sensor further comprising:

three capacitor plates forming two capacitors, comprising a first and a second overlapping capacitor formed on two of said mover plates, wherein relative positive movement of one of said two mover plates increases said first capacitor's capacitance and decreases said second capacitor's capacitance, and wherein relative negative movement of the same mover plate increases said second capacitor's capacitance and decreases said first capacitor's capacitance.

19. The micro-mover of claim 18, further comprising:

a first and a second timer circuit, said timer circuits respectively connected to said first and second capacitors, such that when the capacitance of a capacitor associated with a timer is changed, the frequency output of said timer changes; and a third capacitor/third timer for canceling effects of stray capacitance that has the same stray capacitance as said first and second capacitors but no moving plates.

20. The micro-mover of claim 1, further comprising:

at least one Z-capacitor for controlling and maintaining plate spacing.

21. The micro-mover of claim 11, wherein said electrical leads are routed over said springs to said moving plate on either one or both sides of said plate.

22. The micro-mover of claim 11, further comprising:

an umbilical connector, including leads formed on a flexible insulator that spans a gap between said moving plate and a non-moving portion of said plate.

23. A micro-mover, comprising:

at least two etched single crystal silicon plates, at least one of said plates including a plate suspension system that facilitates relative plate motion with high resolution, while preventing changes in plate spacing due to such effects as external acceleration, temperature, humidity, and aging; and an actuator that moves said plates in response to electrical signals, while exhibiting only minimal cross-talk between respective axes of plate motion.

24. A micro-mover, comprising:

at least one etched single crystal silicon plate, said plate including integral suspension springs that support a moving plate portion, said suspension springs having a symmetrical double folded spring configuration, including a spring formed at each corner or on each side of said moving plate;

means for driving said moving plate portion by planar electromagnetic actuation, including at least one of an X-axis multipole magnet, a Y-axis multipole magnet, and an X-axis/y-axis multipole magnet, at least one drive coil for effecting plate motion, wherein current in said drive coil reacts with a magnetic field developed by said magnet to produce a force that moves said plate against the force of said plate suspension springs, at least one torque coil for producing a correction torque to cancel unwanted torque produced by said drive coil, and a flux return plate;

at least one capacitance position sensor, adapted to change capacitance with relative parallel plate motion, and for producing an output signal in accordance therewith;

at least one Z-capacitor for controlling and maintaining plate spacing;

one or more contact pads and associated electrical leads; and one or more covers for hermetically enclosing said micro-mover, at least one of said covers including one or more spacing posts, and a seal gasket.

25. The micro-mover of claim 24, comprising:

two substantially identical, closely spaced silicon plates, wherein a first of said plates is adapted for movement in an X-direction, and wherein a second of said plates is adapted for movement in a Y-direction, wherein said two plates are assembled facing each other, closely spaced and parallel, having axes of motion at 90° apart.

26. The micro-mover of claim 24, further comprising:

a first, stationary silicon plate; and a second silicon plate comprising compound springs that are adapted to allow said plate to move in both an X-direction and a Y- direction, opposite said first, stationary plate.

* * * * *